United States Patent
Kunugi et al.

(10) Patent No.: US 6,963,636 B1
(45) Date of Patent: Nov. 8, 2005

(54) VALUABLE CIPHER INFORMATION ISSUING SYSTEM AND ISSUING METHOD, TELEPHONE CHARGE SETTLEMENT SYSTEM AND TELEPHONE CHARGE SETTLEMENT METHOD, AND CHARGE SETTLEMENT SYSTEM AND CHARGE SETTLEMENT METHOD

(75) Inventors: Takanobu Kunugi, Tokorozawa (JP); Yurako Kunugi, Tokorozawa (JP)

(73) Assignee: Great Information Co., Ltd., Tokyo (JP)

( * ) Notice: Subject to any disclaimer, the term of this patent is extended or adjusted under 35 U.S.C. 154(b) by 829 days.

(21) Appl. No.: 10/069,606

(22) PCT Filed: Aug. 30, 2000

(86) PCT No.: PCT/JP00/05877

§ 371 (c)(1),
(2), (4) Date: Feb. 25, 2002

(87) PCT Pub. No.: WO01/19067

PCT Pub. Date: Mar. 15, 2001

(30) Foreign Application Priority Data

Sep. 2, 1999 (JP) .................................. 11-248617

(51) Int. Cl.[7] ........................................... H04M 15/00
(52) U.S. Cl. .............................. 379/114.2; 379/114.17; 455/405; 455/406; 705/39; 235/381
(58) Field of Search .......................... 379/114.2, 114.7, 379/114.15, 114.01; 455/405, 406; 705/39, 705/40; 235/380, 381

(56) References Cited

U.S. PATENT DOCUMENTS

| 6,202,155 B1 * | 3/2001 | Tushie et al. ................ 713/200 |
| 6,516,324 B1 * | 2/2003 | Jones et al. .............. 707/104.1 |
| 6,526,130 B1 * | 2/2003 | Paschini ................... 379/93.12 |
| 6,771,640 B2 * | 8/2004 | Karamchedu et al. ...... 370/352 |
| 6,793,135 B1 * | 9/2004 | Ryoo .......................... 235/383 |
| 2002/0087529 A1 * | 7/2002 | Dutcher et al. ................. 707/3 |

FOREIGN PATENT DOCUMENTS

| JP | 05-284257 A1 | 10/1993 |
| JP | 06-244993 A1 | 9/1994 |
| JP | 09-312708 A1 | 12/1997 |
| JP | 11-506558 A1 | 6/1999 |
| WO | WO-99/46925 A1 | 9/1999 |
| WO | WO-00/08841 A1 | 2/2000 |
| WO | WO-00/54490 A1 | 9/2000 |

* cited by examiner

Primary Examiner—Rexford Barnie
(74) Attorney, Agent, or Firm—Darby & Darby

(57) ABSTRACT

An object of the invention is to realize a valuable cipher information issuing system that is entirely free of a risk of theft during the course of distribution.

To this end, a valuable cipher information issuing system 10 is constructed so as to be provided with cipher information storing means 12 for accumulating pieces of cipher information each being a string of a prescribed number of characters, requested amount of money input means 14 through which to select and input a desired amount of money, paid amount of money input means 16 through which to input an actually paid amount of money, valuable cipher information generating means 22 for generating valuable cipher information by correlating cipher information with the amount of money when the requested amount of money coincides with the paid amount of money, valuable cipher information storing means 24 for storing the valuable cipher information, and valuable cipher information output means 26 for outputting the valuable cipher information.

4 Claims, 19 Drawing Sheets

FIG. 14

| COUNTRY NUMBER | AREA CODE | DAYTIME | | NIGHT/HOLIDAY | | MIDNIGHT | |
|---|---|---|---|---|---|---|---|
| | | FIRST ONE MINUTE | AFTER LAPSE OF ONE MINUTE | FIRST ONE MINUTE | AFTER LAPSE OF ONE MINUTE | FIRST ONE MINUTE | AFTER LAPSE OF ONE MINUTE |
| . . . | . . . | . . . | . . . | . . . | . . . | . . . | . . . |
| 54 | — | 39 | 30 | 31 | 24 | 27 | 21 |
| . . . | . . . | . . . | . . . | . . . | . . . | . . . | . . . |
| 82 | — | 28 | 14 | 22 | 11 | 20 | 10 |
| . . . | . . . | . . . | . . . | . . . | . . . | . . . | . . . |

VALUABLE CIPHER INFORMATION ISSUING SYSTEM AND ISSUING METHOD, TELEPHONE CHARGE SETTLEMENT SYSTEM AND TELEPHONE CHARGE SETTLEMENT METHOD, AND CHARGE SETTLEMENT SYSTEM AND CHARGE SETTLEMENT METHOD

TECHNICAL FIELD

The present invention relates to a technique of issuing valuable cipher information in which a certain monetary value is added to cipher information that is a prescribed character string.

The invention also relates to a telephone call charge or charge settlement system and settlement method using such valuable cipher information.

BACKGROUND ART

At present, to make an overseas call (international call) from a mobile communication terminal such as a cellular phone, a PHS phone, or the like, the regular procedure is to make, in advance, a use contract with a international communication company. Specifically, a user writes his name, address, and place for contact, a payment method, etc. on a "cellular phone/PHS phone international use contract application form" and presents it to an international communication company. At this time, a person who has a credit card can select "credit card payment" as a payment method. However, a person who does not have a credit card is obliged to select "bill payment" that requires payment of deposit after having himself examined by going to the international communication company or by means of a letter or the like. Therefore, certain time is needed until admission.

In the case of a mobile communication terminal, since the communication terminal is mobile literally and it is difficult to determine the place of the user, the current situation is such that to prevent avoidance of call charge payment it is inevitable to ask the user to follow a strict procedure.

On the other hand, a method using a prepaid card that is dedicated to international calls is also available. In this case, a user inputs, through a cellular phone or the like, the card number (valuable cipher information) that is written on his prepaid card before inputting "(a country number)+(an out-of-town telephone exchange number (area code/region No.))+(a telephone number of a party on the other end (local telephone exchange number+subscriber's number))" of a person on the termination side, whereby the user can perform an overseas telephone conversation within the confines of the amount-of-service number of the card.

Such prepaid cards are issued by individual international communication companies that provide international telephone call services and sold in convenience stores etc.

A prepaid card allows a telephone conversation within the confines of a prepaid amount of money and hence is entirely free of fear of failure in collecting call charges. Therefore, it is not necessary to ask a user to follow a cumbersome procedure such as making a contract or paying deposit in advance. It can be said that this method meets the needs of temporarily staying foreigners and young people who want to make an international call more easily.

However, there are problems that each international communication company needs to bear the cost of not only production of prepaid cards themselves but also transport and storage of cards that are valuable as notes. And there is much risk in the transport and storage of cards.

Prepaid cards for international calls are different from telephone cards that are used with public telephones in such a manner that a card itself is input to a card reader, whereby an amount of money is determined and displayed. Instead, a user inputs the card number shown on a prepaid card by manipulating the dial buttons of his own cellular phone, whereby a telephone conversation corresponding to an amount of money that is assigned to the card number is enabled.

That is, prepaid cards for international calls are merely carriers of valuable cipher information and the valuable cipher information itself shown on each card is important. In this respect, cards may be just sheets of paper. However, to prevent their abuse during the course of their distribution, cards need to be subjected to special processing for concealing the valuable cipher information. Further, to prevent cards from being damaged during their distribution, cards need to have a certain degree of strength. These are factors of cost increase.

Incidentally, although online shopping over the Internet has become popular recently, no safe and easy charge settlement system has been established yet. Usually, money is transferred to the account of a mail-order firm after arrival of a commodity or payment is made to a transport company in exchange for a commodity at the time of its delivery (what is called COD (cash on delivery)). A person having a credit card can make credit card settlement by sending the number, the expiration date, etc. of his own credit card.

However, in the money transfer method, the mail-order firm side always has a risk of failure in charge collection. Further, the commodity purchaser side needs to go to a financial institution to transfer money and must pay a transfer charge.

In the case of the COD method, no failure in charge collection occurs in the mail-order firm side. However, there is a problem that the purchaser side needs to bear a relatively high COD charge.

In the case of using a credit card, the information of a user's own credit card travels through the net. Many people feel reluctant to do so in terms of security. Actually, there is a risk of abuse.

The present invention has been made to solve the above problems in the art, and an object of the invention is therefore to establish a valuable cipher information issuing technique that is entirely free of a risk of theft during the course of its distribution.

Another object of the invention is to establish a technique of settling various charges that is entirely free of a risk of failure in charge collection through application of the above valuable cipher information issuing technique.

DISCLOSURE OF THE INVENTION

To attain the above objects, a first valuable cipher information issuing system according to the present invention comprises cipher information storing means for accumulating pieces of cipher information each being a string of a prescribed number of characters; requested amount of money input means through which to select and input a desired amount of money; paid amount of money input means through which to input an actually paid amount of money; valuable cipher information generating means for generating valuable cipher information by correlating the cipher information with the requested amount of money when the requested amount of money coincides with the paid amount of money; valuable cipher information storing means for storing the valuable cipher information; and valuable cipher information output means for outputting the valuable cipher information.

A first valuable cipher information issuing method according to the invention comprises a step of accumulating, in cipher information storing means, pieces of cipher information each being a string of a prescribed number of characters; a step of inputting a desired amount of money; a step of inputting an actually paid amount of money; a step of generating valuable cipher information by correlating the cipher information with the requested amount of money when the requested amount of money coincides with the paid amount of money; a step of storing the valuable cipher information in valuable cipher information storing means; and a step of outputting the valuable cipher information.

A second valuable cipher information issuing system according to the invention comprises cipher information storing means for accumulating pieces of cipher information each being a string of a prescribed number of characters; requested amount of money input means through which to select and input a desired amount of money; card information input means through which to input information relating to a credit card; card settlement processing means for sending the credit card information and the requested amount of money to an external computer system to request credit card settlement, and for checking whether the credit card settlement has completed; valuable cipher information generating means for generating valuable cipher information by correlating the cipher information with the requested amount of money when the credit card settlement has completed; valuable cipher information storing means for storing the valuable cipher information; and valuable cipher information output means for outputting the valuable cipher information.

A second valuable cipher information issuing method according to the invention comprises a step of accumulating, in cipher information storing means, pieces of cipher information each being a string of a prescribed number of characters; a step of inputting a desired amount of money; a step of inputting information relating to a credit card; a step of sending the credit card information and the requested amount of money to an external computer system to request credit card settlement; a step of checking whether the credit card settlement has completed; a step of generating valuable cipher information by correlating the cipher information with the requested amount of money when the credit card settlement has completed; a step of storing the valuable cipher information in valuable cipher information storing means; and a step of outputting the valuable cipher information.

As described above, instead of distributing cards in a state that cipher information that is correlated with an amount-of-money information in advance is shown on each card, valuable cipher information is generated by correlating cipher information with amount-of-money information and is directly output to a user at a time point when cash payment or completion of settlement using a credit card has been confirmed. This makes it possible to completely eliminate risks that accompany the conventional system and method in which prepaid cards having a monetary value are distributed.

Since valuable cipher information is directly issued to a person who wants to use it, it is not necessary to output it to a rigid card or to perform special processing for hiding a number. Therefore, valuable cipher information can be issued very easily at a low cost.

Once issued in the above manner, valuable cipher information can be used in entirely the same manner as conventional international call prepaid cards.

That is, a first telephone call charge settlement system according to the invention comprises, as a prerequisite system, the first valuable cipher information issuing system or the second valuable cipher information issuing system (pieces of cipher information each being a character string including at least an access number to be used for making a connection to an exchange of a particular communication company are accumulated in the cipher information storing means in advance), and additionally comprises charge storing means for accumulating charge systems of the communication companies; balance checking means for checking, when valuable cipher information and a termination-side telephone number are input from a calling-side terminal, a balance of the valuable cipher information by searching the valuable cipher information storing means using the valuable cipher information as a key; line connection means for establishing a connection between the calling-side terminal and the termination-side terminal if the balance is greater than or equal to a prescribed amount; call allowable time calculating means for calculating a call allowable time by applying the termination-side telephone number and the balance to the charge system; call time measuring means for measuring a time of a call between the calling-side terminal and the termination-side terminal; line disconnection means for disconnecting a speech channel between the calling-side terminal and the termination-side terminal at a time point when the call allowable time has elapsed; call charge calculating means for calculating a call charge by applying the call time to the charge system; and balance reducing means for subtracting the call charge from the balance.

A first telephone call charge settlement method according to the invention is a telephone call charge settlement method including the first valuable cipher information issuing method or the second valuable cipher information issuing method, comprises a step of accumulating pieces of cipher information each being a character string including at least an access number to be used for making a connection to an exchange of a particular communication company (e.g., several high-order characters correspond to an access number) in the cipher information storing means; a step of accumulating charge systems of the communication companies in charge storing means; a step of checking, when valuable cipher information and a termination-side telephone number are input from a calling-side terminal, a balance of the valuable cipher information by searching the valuable cipher information storing means using the valuable cipher information as a key; a step of establishing a connection between the calling-side terminal and the termination-side terminal if the balance is greater than or equal to a prescribed amount; a step of calculating a call allowable time by applying the termination-side telephone number and the balance to the charge system; a step of measuring a time of a call between the calling-side terminal and the termination-side terminal; a step of disconnecting a speech channel between the calling-side terminal and the termination-side terminal at a time point when the call allowable time has elapsed; a step of calculating a call charge by applying the call time to the charge system; and a step of subtracting the call charge from the balance.

A second telephone call charge settlement system according to the invention comprises, in addition to the first valuable cipher information issuing system or the second valuable cipher information issuing system, charge storing means for accumulating charge systems of the communication companies; balance checking means for checking, when valuable cipher information and a termination-side telephone number are input from a calling-side terminal, a balance of the valuable cipher information by searching the valuable cipher information storing means using the valuable cipher information as a key; line connection means for establishing a connection between the calling-side terminal and the termination-side terminal if the balance is greater than or equal to a prescribed amount; call time measuring means for measuring a time of a call between the calling-side terminal and the termination-side terminal; balance reducing means for calculating a call charge every prescribed unit time and reducing the balance each time; and line disconnection means for disconnecting a speech channel between the calling-side terminal and the termination-side terminal at a time point when the balance has become smaller than or equal to a prescribed amount. Also in this case, pieces of cipher information each being a character string including at least an access number to be used for making a connection to an exchange of a particular communication company are accumulated in the cipher information storing means in advance.

A second telephone call charge settlement method according to the invention is a telephone call charge settlement method including the first valuable cipher information issuing method or the second valuable cipher information issuing method, comprises a step of accumulating pieces of cipher information each being a character string including at least an access number to be used for making a connection to an exchange of a particular communication company in the cipher information storing means a step of accumulating charge systems of the communication companies in charge storing means; a step of checking, when valuable cipher information and a termination-side telephone number are input from a calling-side terminal, a balance of the valuable cipher information by searching the valuable cipher information storing means using the valuable cipher information as a key; a step of establishing a connection between the calling-side terminal and the termination-side terminal if the balance is greater than or equal to a prescribed amount; a step of measuring a time of a call between the calling-side terminal and the termination-side terminal; a step of calculating a call charge every prescribed unit time and reducing the balance each time; and a step of disconnecting a speech channel between the calling-side terminal and the termination-side terminal at a time point when the balance has become smaller than or equal to a prescribed amount.

The above-described valuable cipher information can also be used for settlement of charges of kinds other than a call charge. That is, a charge settlement system according to the invention comprises, in addition to the first valuable cipher information issuing system or the second valuable cipher information issuing system, balance checking means for checking, when a request for settlement of a charge is made with input of valuable cipher information, a balance of the valuable cipher information by searching the valuable cipher information storing means using the valuable cipher information as a key; settlement allowability determining means for determining whether the settlement is allowable by comparing the balance with the charge; and settlement processing means for subtracting an amount of money corresponding to the charge from the balance and allotting it to the settlement if the settlement is allowable.

A charge settlement method according to the invention includes the first valuable cipher information issuing method or the second valuable cipher information issuing method, and comprises a step of checking, when a request for settlement of a charge is made with input of valuable cipher information, a balance of the valuable cipher information by searching the valuable cipher information storing means using the valuable cipher information as a key; a step of determining whether the settlement is allowable by comparing the balance with the charge; and a step of subtracting an amount of money corresponding to the charge from the balance and allotting it to the settlement if the settlement is allowable.

BRIEF DESCRIPTION OF THE DRAWINGS

FIG. 14 is a table showing a charge system of an international communication company;

BEST MODE FOR CARRYING OUT THE INVENTION

Figure 1:
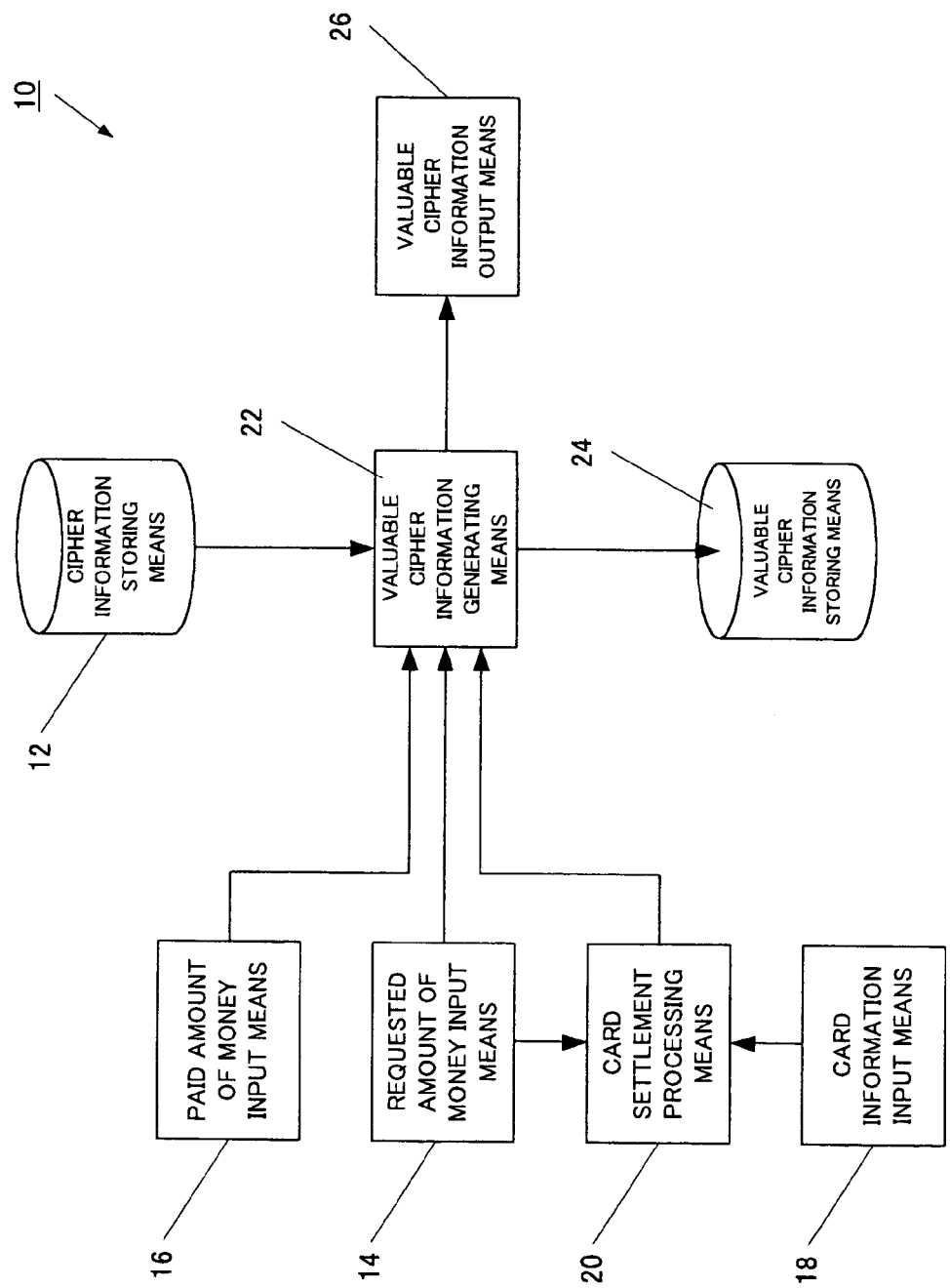
FIG. 1 is a block diagram outlining a valuable cipher information issuing system according to the present invention.

FIG. 1 is a functional block diagram of a valuable cipher information issuing system 10 according to the present invention. The valuable cipher information issuing system 10 is provided with a cipher information storing means 12 for storing, in advance, a number of pieces of cipher information each being a string of a prescribed number of characters.

For example, the cipher information storing means 12 is a cipher information database in a hard disk drive that is connected to a computer system.

Also provided are a requested amount of money input means 14 through which a user of this system select and input an amount of money he wants to spend and a paid amount of money input means 16 through which the user inputs an amount of money he actually paid.

For example, the above-mentioned requested amount of money input means 14 and paid amount of money input means 16 are an information input device such as a keyboard and a mouse, a touch panel, or a bar code scanner.

Also provided are a card information input means 18 through which information relating to a credit card of a user is input and a card settlement processing means 20 for requesting credit card settlement by sending the information relating to the credit card and the above-mentioned requested amount of money to a computer system managed by a card company and for outputting card settlement completion information after confirming that the credit card settlement has completed.

For example, the above-mentioned card information input means 18 is a keyboard through which such information as a kind of credit card (the name of a card company), a card number, an expiration date, and the name of a registered person is input manually or a card reader for reading magnetic data of a credit card recorded in a magnetic tape section, and others. The above-mentioned card settlement processing means 20 is the CPU of a computer that performs necessary processing according to a dedicated program.

Further provided are a valuable cipher information generating means 22 for generating valuable cipher information by correlating the above-mentioned cipher information with the above-mentioned amount-of-money information when the above-mentioned requested amount of money coincides with the above-mentioned paid amount of money or the above-mentioned card settlement processing means has output settlement completion information, a valuable cipher information storing means 24 for storing the valuable cipher information, and a valuable cipher information output means 26 for output the above-mentioned valuable cipher information.

The above-mentioned valuable cipher information generating means 22 is the CPU of a computer that performs necessary processing according to a dedicated program. For example, the above-mentioned valuable cipher information storing means 24 is a valuable cipher information database in a hard disk drive that is connected to a computer. The above-mentioned valuable cipher information output means 26 is a printer, a display device, or the like that is connected to a computer.

A user of the system 10 inputs a desired amount of money (e.g., ¥5,000) to a computer system of the system 10 through the requested amount of money input means 14 and pays cash of ¥5,000 to the system operator side.

After confirming the payment of ¥5,000, the system operator side inputs the fact of payment of ¥5,000 to the system through the paid amount of money input means 16.

If the above-mentioned requested amount of money coincides with the above-mentioned paid amount of money, the valuable cipher information generating means 22 generates valuable cipher information as described above. Specifically, valuable cipher information is generated in such a manner that one piece of cipher information (e.g., 31-723-7381-5419-#) is selected from plural pieces of cipher information accumulated in the cipher information storing means 12 and value information of ¥5,000 is added to the cipher information.

This valuable cipher information is stored in the dedicated valuable cipher information storing means 24 and communicated to the user via the valuable cipher information output means 26.

From this time onward, the user can settle various charges within the confines of ¥5,000 by showing the valuable cipher information. Naturally, the balance, which was originally ¥5,000, decreases at each settlement by a paid amount of money.

Since the card information input means 18 and the card settlement processing means 20 are also provided as described above, ¥5,000 can also be paid by a credit card instead of cash.

According to this valuable cipher information issuing system 10, a property value is added to cipher information only after money is paid by a user. No amount-of-money information is added to cipher information in advance unlike the case of conventional prepaid cards for international calls. Therefore, there is no risk of theft during the course of delivery to the user.

Naturally, there is a risk that issued valuable cipher information is stolen and used by a third party. However, since the amount of damage is within an amount of money that was set by a user himself, there does not occur an unexpectedly large amount of damage as would be caused by theft of a credit card or a cash card.

Figure 2:
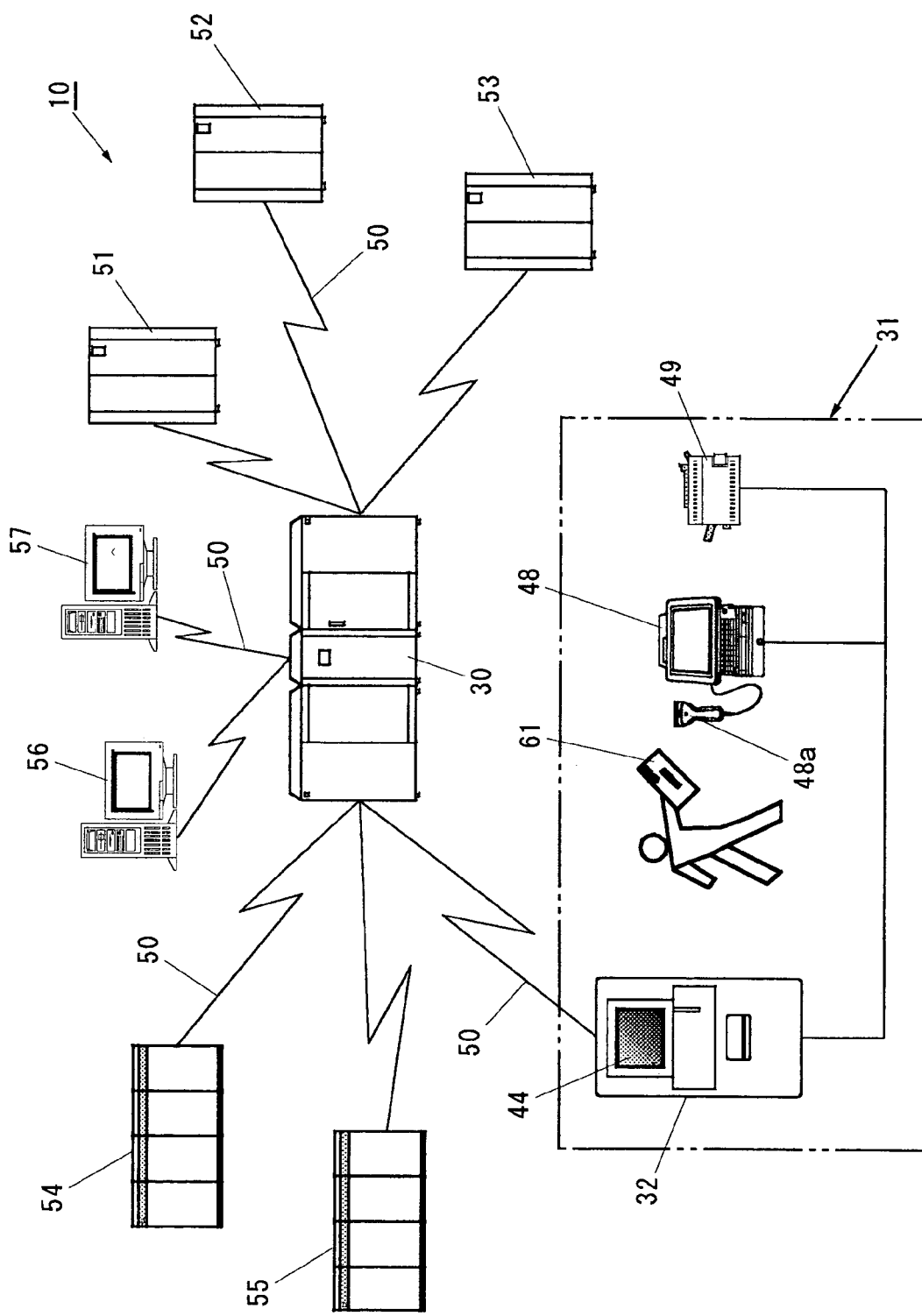
FIG. 2 shows a hardware configuration of the above valuable cipher information issuing system.

FIG. 2 shows a specific configuration example of the valuable cipher information issuing system 10, which is provided with a center apparatus 30 that is installed in a center facility and a terminal apparatus 32 that is installed in convenience stores 31. Although only one terminal apparatus 32 is shown in the figure, actually terminal apparatuses 32 are installed in respective convenience stores in the whole country.

Figure 3:
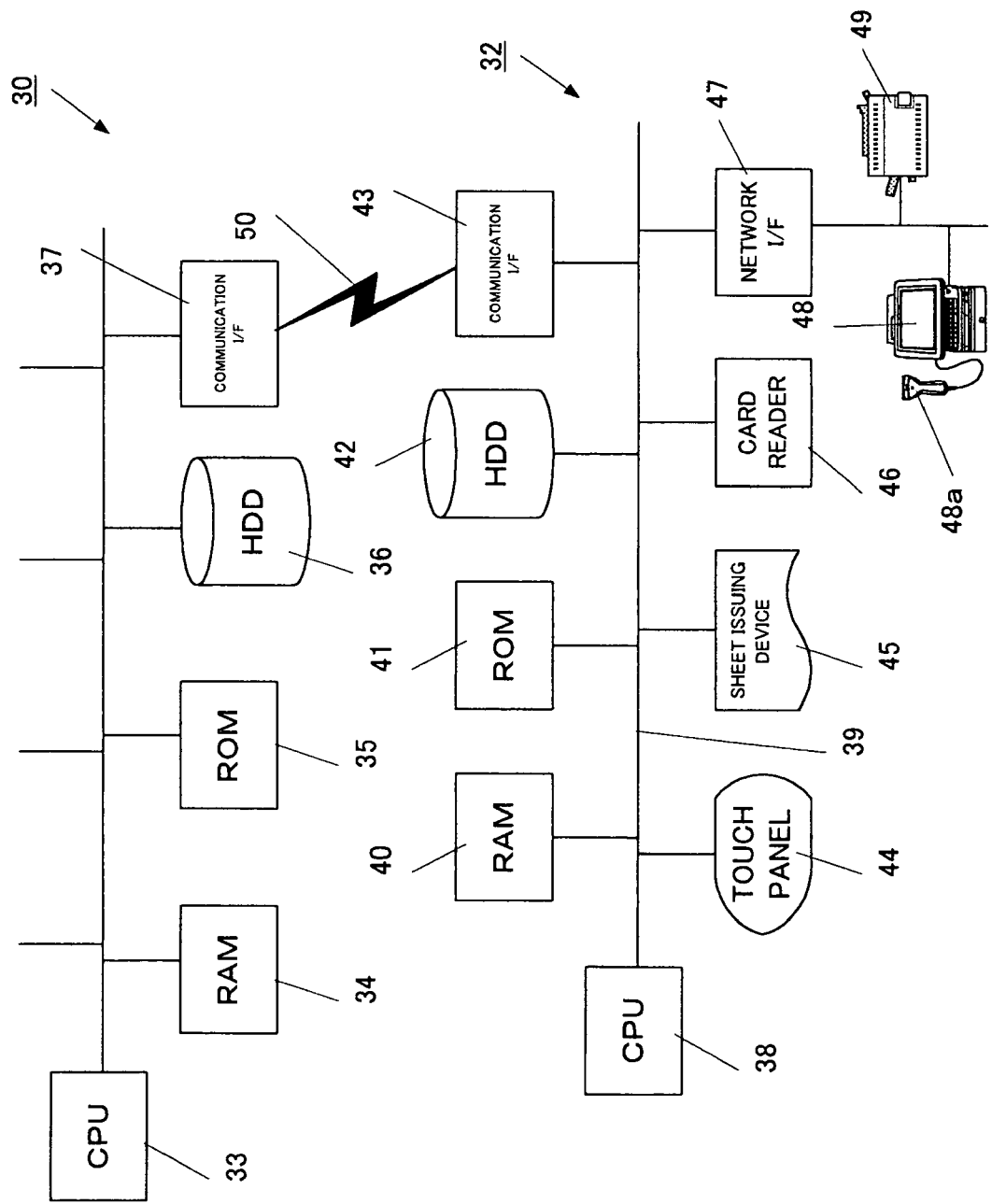
FIG. 3 shows hardware configurations of a center apparatus and a terminal apparatus.
Figure 4:
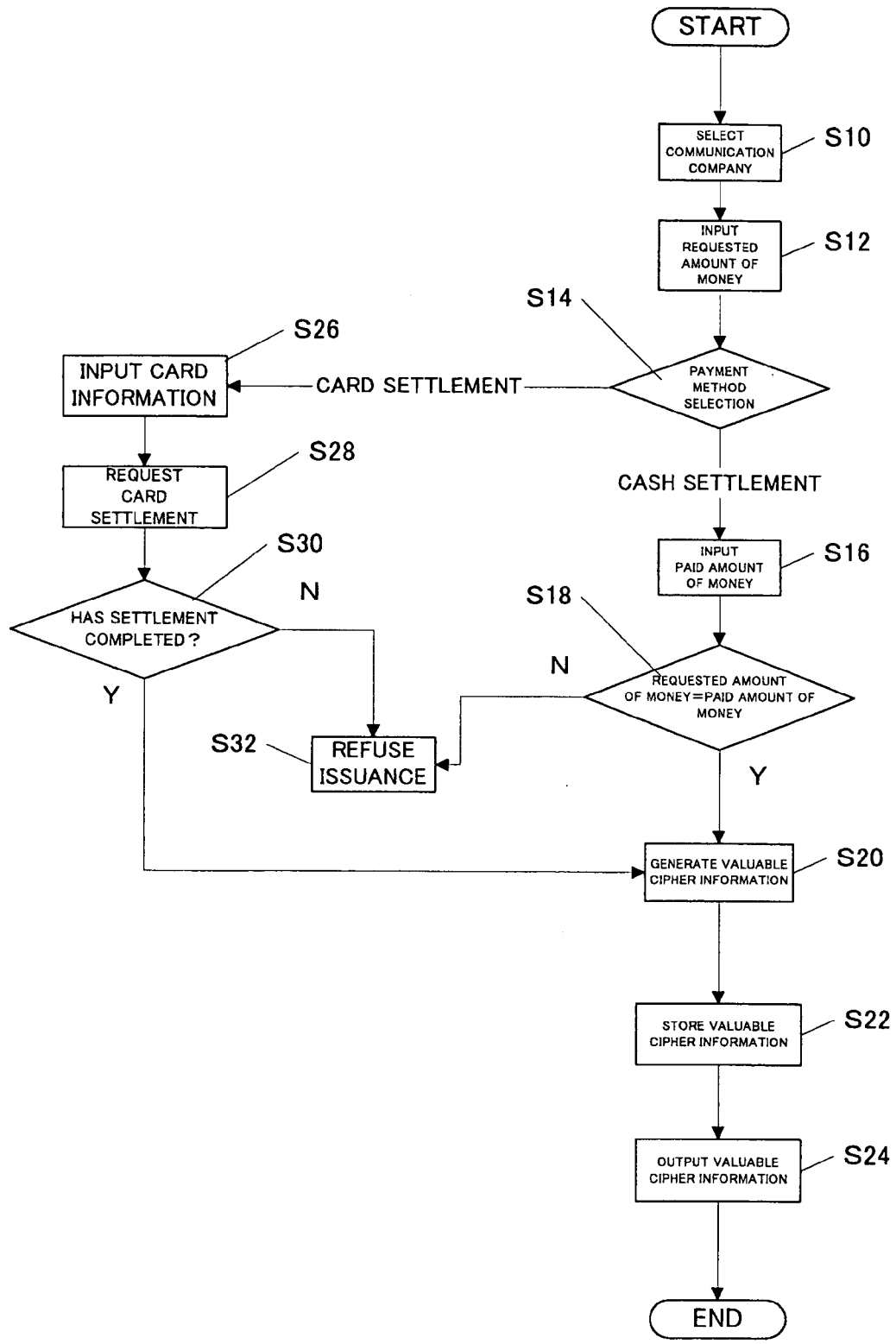
FIG. 4 is a flowchart showing a processing procedure in the above valuable cipher information issuing system.

The above-mentioned center apparatus 30 is a computer system such as a mainframe, and is provided with a CPU 33, a RAM 34, a ROM 35, a hard disk drive 36, a communication interface 37, etc. as shown in FIG. 3.

The CPU 33 plays roles of the card settlement processing means 20 and the valuable cipher information generating means 22 by starting and executing an OS and dedicated programs that are installed in the hard disk drive 36.

A cipher information database as the cipher information storing means 12 and a valuable cipher information database as the valuable cipher information storing means 24 are stored in the above-mentioned hard disk drive 36.

The above-mentioned terminal apparatus 32 is a computer system similar to a personal computer, and is provided with a CPU 38 and a RAM 40, a ROM 41, a hard disk drive 42, a communication interface 43, a display 44 with a touch panel, a sheet issuing device 45, a card reader 46, a network interface 47, etc. that are connected to the CPU 33 via a system bus 39. A POS terminal 48 and a printer 49 that are installed in the convenience store 31 are LAN-connected to the terminal apparatus 32 via the network interface 47.

The above-mentioned display 44 with a touch panel corresponds to the requested amount of money input means 14, the above-mentioned sheet issuing device 45 and printer 49 correspond to the valuable cipher information output means 26, a bar code scanner 48a and keys of the above-mentioned POS terminal 48 correspond to the paid amount of money input means 16, and the above-mentioned card reader 46 corresponds to the card information input means 18.

The CPU 38 controls the individual devices connected thereto by executing an OS and dedicated programs that are installed in the hard disk drive 42.

The center apparatus 30 and the terminal apparatus 32 are network-connected to each other via the respective communication interfaces 37 and 43 and a communication line 50.

Other various computer systems, which are computer systems (exchanges) 51–53 that are managed by international communication companies, computer systems 54 and 55 that are managed by respective credit card companies, computer systems 56 and 57 of mail-order firms, etc., are connected to the above-mentioned center apparatus 30 via communication lines 50.

Each the above computer systems has at least approximately the same configuration as the center apparatus 30 shown in FIG. 3.

Unused pieces of cipher information are added to the center-apparatus-30-side cipher information database from the computer systems 51–53 managed by the external international communication companies over the communication lines 50. Valuable cipher information that has been generated by the valuable cipher information generating means 22 and stored in the valuable cipher information database of the center apparatus 30 is sent to the computer systems 51–53 of the international communication companies also over the communication lines 50.

Next, an operation example of the valuable cipher information issuing system 10 will be described with reference to FIGS. 4–11.

Figure 5:
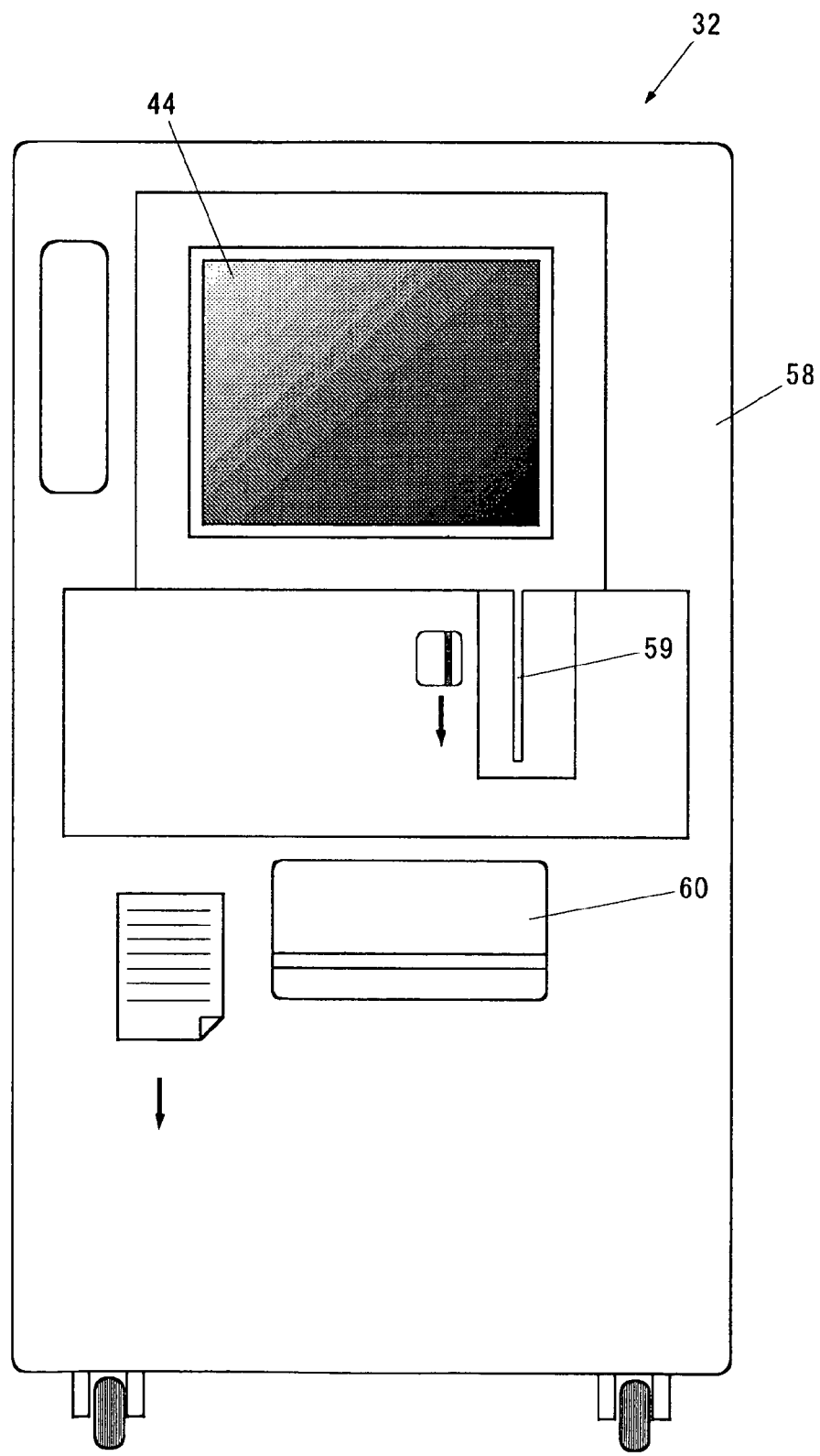
FIG. 5 is a front view of a terminal apparatus.

FIG. 5 shows an appearance of the above-mentioned terminal apparatus 32. The above-mentioned display 44 with a touch panel is provided in a top portion of a chassis 58 on the front side. A credit card sliding slit 59 is provided under the display 44. A sheet ejection mouth 60 is provided under the credit card sliding slit 59.

First, a user presses the surface of the display 44 with a finger and makes an input for selecting a valuable cipher information issuance service from a displayed service menu.

For example, he selects an "international call prepaid sheet printing service" in which valuable cipher information will be used for call charge settlement (not shown).

Figure 6:
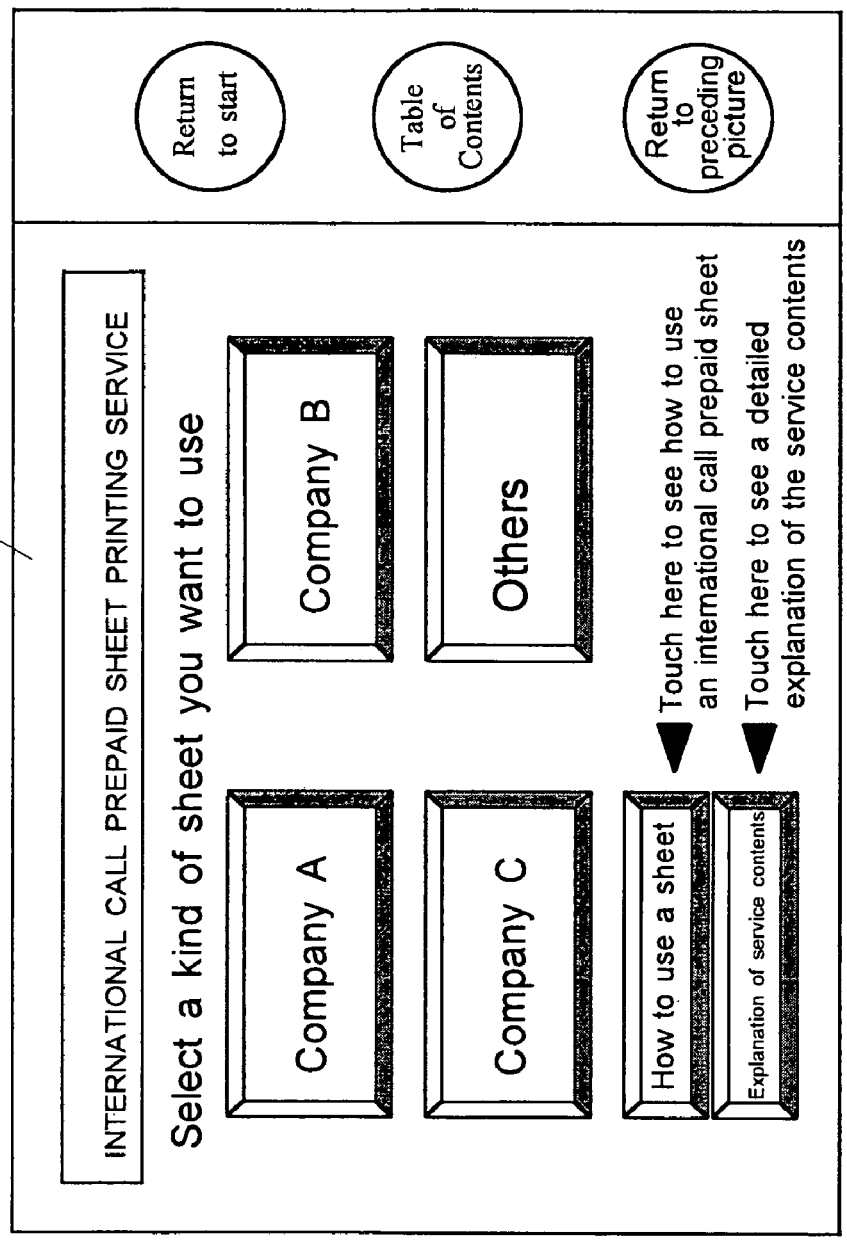
FIG. 6 shows an example picture displayed on a display of the terminal apparatus.

As a result, a picture for selection among international communication companies A–C etc. is displayed as shown in FIG. 6.

Figure 7:
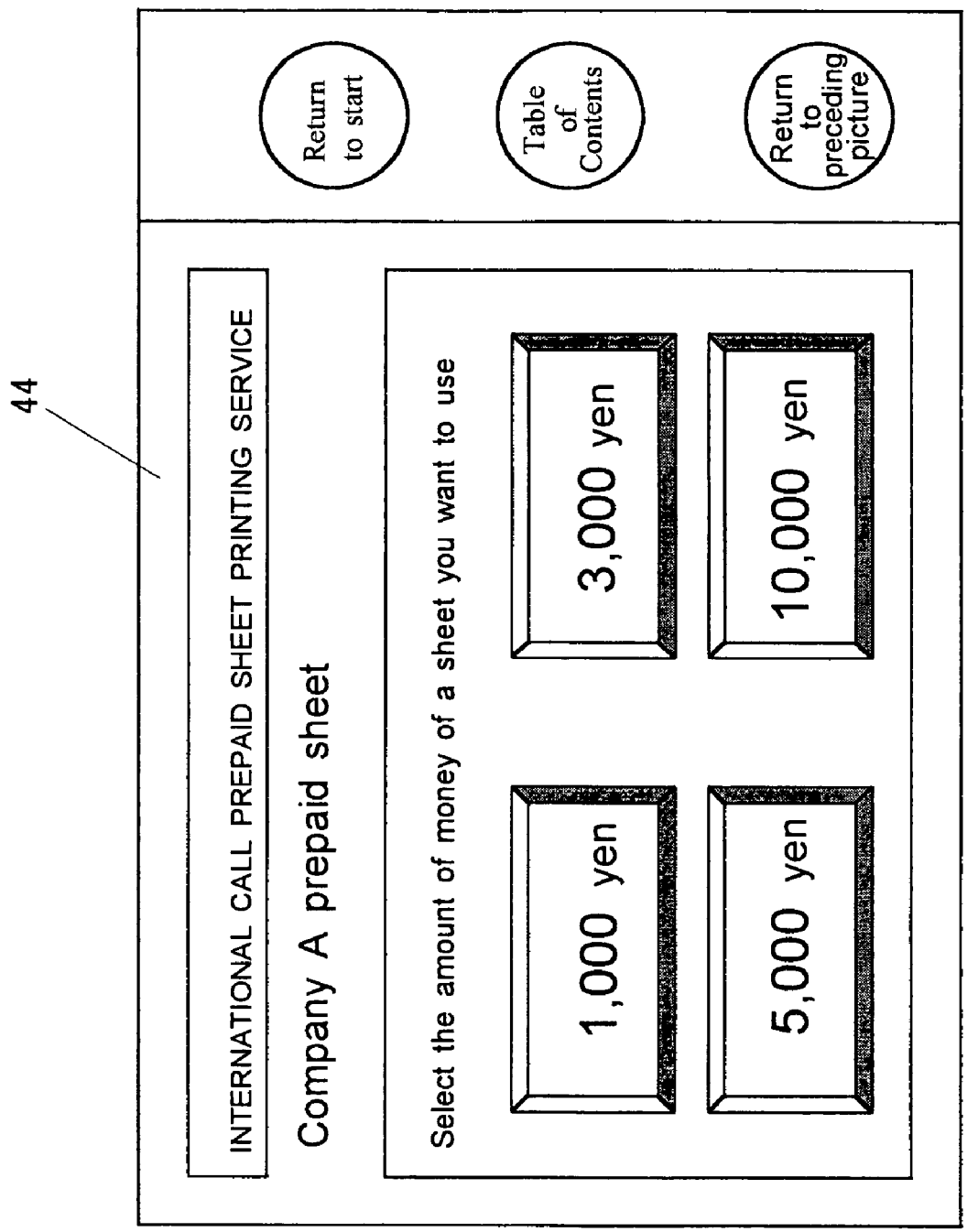
FIG. 7 shows an example picture displayed on a display of the terminal apparatus.

If one company (e.g., company A) is selected from the above companies (S10 in FIG. 4), an amount of money selection picture is displayed (FIG. 7).

Figure 8:
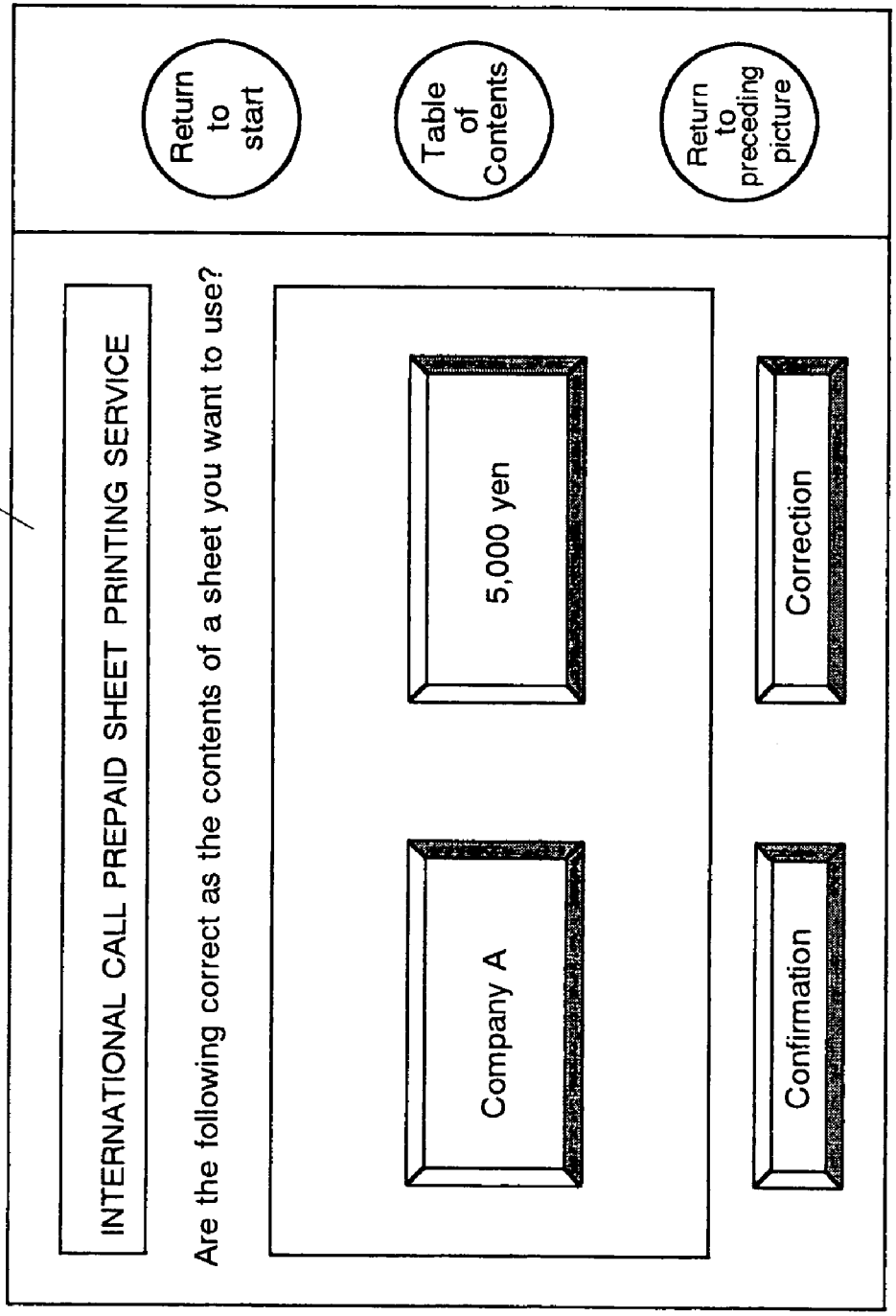
FIG. 8 shows an example picture displayed on a display of the terminal apparatus.

If a necessary amount of money (e.g., ¥5,000) is selected from the items in the picture (S12), a confirmation picture is displayed (FIG. 8). If the international communication company and the amount of money are correct, the user touches a "Confirmation" button. If he wants to make a change, he touches a "Correction" button to restart the process.

Then, a payment method selection picture is displayed (FIG. 9), and the user selects cash payment or credit card payment (S14).

Figure 10:
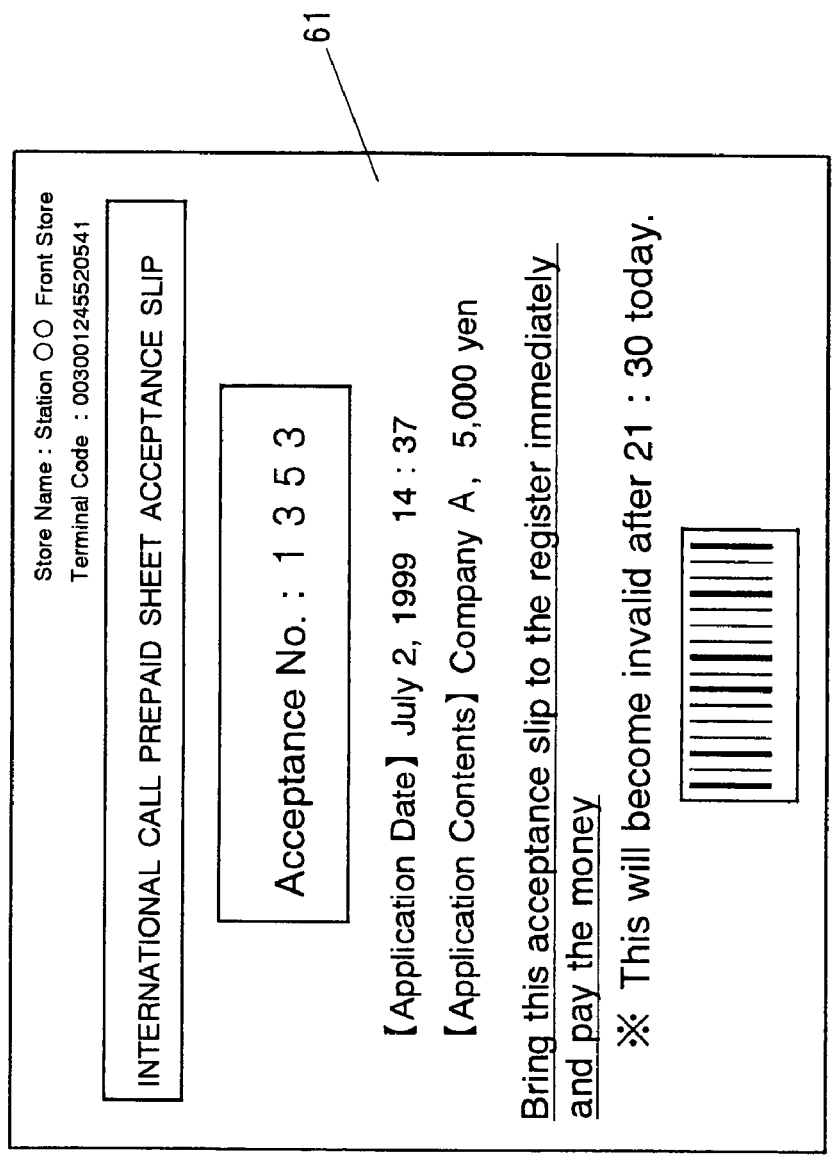
FIG. 10 is a plan view of an acceptance slip as output from the terminal apparatus.

If cash settlement is selected by touching a "Cash" button at this step, the sheet issuing device 45 in the terminal apparatus 32 starts to operate, whereby an acceptance slip 61 shown in FIG. 10 is printed and issued through the sheet ejection mouth 60.

At the same time, the amount-of-money information "¥5,000" that was selected and input is sent to the center apparatus 30 over the communication line 50.

In addition to an acceptance number, an application date and time, application contents, etc., a bar code corresponding to the application contents is printed on the acceptance slip 61.

The user brings the acceptance slip 61 to a register of the convenience store 31 and pays ¥5,000 by cash. A clerk in the convenience store checks whether the amount of money is correct and then inputs the bar code of the acceptance slip 61 with the scanner 48a of the POS terminal (S16).

The payment information "¥5,000" that has been input with the scanner 48a is sent to the center apparatus 30 via the terminal apparatus 32.

In the center apparatus 30, the paid amount of money is compared with the requested amount of money that was sent before. If they coincide with each other (S18), head cipher information (e.g., "31-723-7381-5419-#") in the cipher information list of company A that is stored in advance in the cipher information database in the hard disk drive 36 is selected. Valuable cipher information is generated by correlating the value information "¥5,000" with the cipher information (S20), and stored in the valuable cipher information database for company A (S22).

Figure 11:
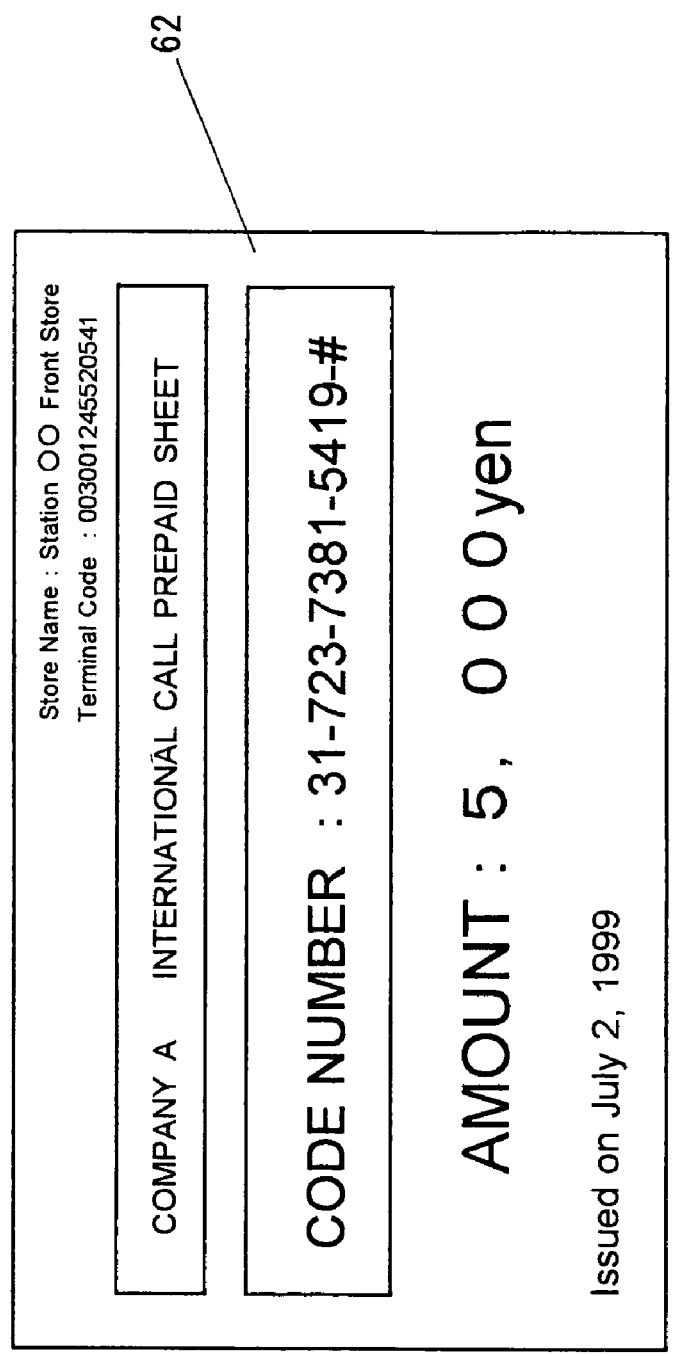
FIG. 11 is a plan view of an international call prepaid sheet on which valuable cipher information is written.

At the same time, a valuable cipher information output instruction is issued to the terminal apparatus 32 over the communication line 50. As a result, an international call prepaid sheet 62 shown in FIG. 11 is issued from the printer 49 that is provided near the register in the convenience store 31 (S24).

In addition to characters "5,000 yen" indicating the amount of money, the valuable cipher information (code number) generated by the center apparatus 30 is written on the prepaid sheet 62.

From this time onward, the user can receive an international call service of ¥5,000 from company A using this code number. The details will be described later.

Figure 9:
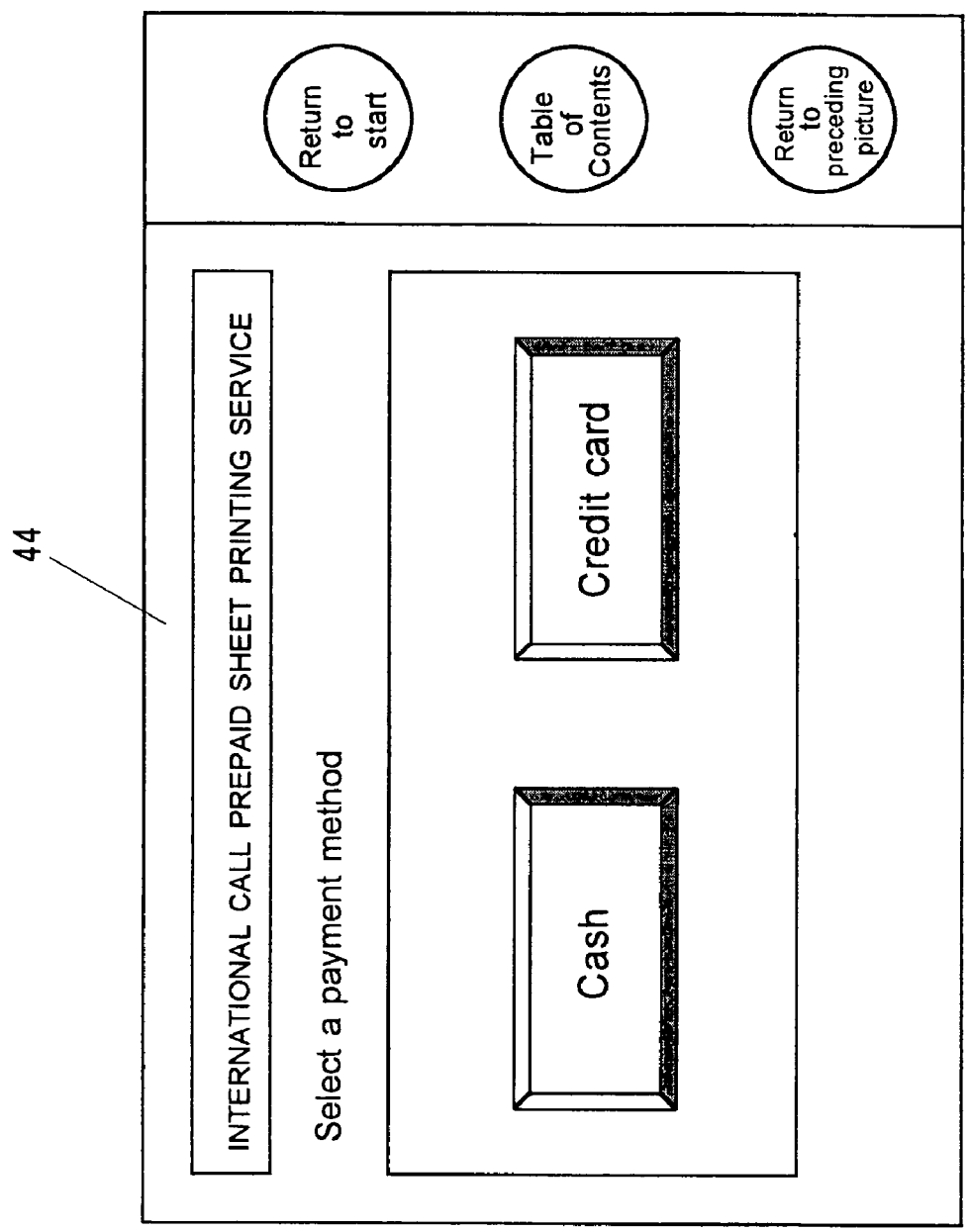
FIG. 9 shows an example picture displayed on a display of the terminal apparatus.

If credit settlement is selected in the payment method selection picture of FIG. 9 (S14), a guidance picture (not shown) urging the user to input credit card information is displayed on the display 44 with a touch panel.

Following the guidance picture, the user inserts the magnetic data recording section of his own credit card into the slit 59 and slides the credit card in the direction indicated by an arrow, whereby the card reader 46 that is provided inside the slit 59 reads the credit card information that is recorded in the magnetic data recording section. This information is sent to the center apparatus 30 over the communication line 50 and input to it (S26).

The center apparatus 30 sends the credit card information to the computer system 54 of the card company and requests settlement of ¥5,000 using the credit card (S28).

When a settlement completion notice is sent from the computer system 54 of the credit company (S30), the center apparatus 30 generates valuable cipher information according to the same procedure as described above (S20).

In this case, it is not necessary to pay cash at the register in the convenience store 31. A prepaid sheet 62 shown in FIG. 11 is printed by the sheet issuing device 45 of the terminal apparatus 32 and directly supplied from the ejection mouth 60 of the terminal apparatus 32.

It goes without saying that issuance of valuable cipher information is refused (S32) if the paid amount of money is smaller than the requested amount of money at the above-mentioned step S18 or if there occurs no card settlement completion output at S30 because of expiration or the like.

The system may be configured in such a manner that a cash handling device as used in vending machines and cash dispensers in banks is incorporated in the terminal apparatus 32 so that a prepaid sheet 62 on which valuable cipher information is printed is directly output from the ejection mouth 60 of the terminal apparatus 32.

For example, if "Cash" is selected in the payment method selection picture of FIG. 9, a picture (not shown) urging the user to input cash to the cash input mouth is displayed instead of outputting an acceptance slip. If the user inputs cash according to the picture, the input is detected by a sensor and an input amount of money is calculated.

If the input amount of money coincides with the requested amount of money that was selected in the amount of money selection picture (FIG. 7), paid amount of money confirmation data indicating payment of an amount of money that coincides with the requested amount of money is generated and sent to the center apparatus 30 over the communication line 50 and input to it.

In the center apparatus 30, valuable cipher information is generated according to the same procedure as described above and sent to the terminal apparatus 32. The sheet issuing device 45 is driven and caused to output a prepaid sheet 62 on which the valuable cipher information is written.

If the amount of money is smaller, a message to the effect that "no transaction can be made because of an insufficient amount of money" and a message urging the user to input the requested amount of money is displayed again and the money that was input is returned.

Conversely, if the amount of money is larger, change is returned through a cash return mouth and then a prepaid sheet 62 on which the valuable cipher information is written is output in the same manner as described above.

Giving the terminal apparatus 32 itself functions of handling input of cash, calculating an amount of money, and handling return of money as described above makes it possible to save a user's time and labor for bringing an acceptance slip 61 that is output from the terminal apparatus 32 to a register and paying cash there in the above-described manner.

Although the above description is directed to the case that pictures on the terminal apparatus 32 is displayed and an acceptance slip 61 and a prepaid sheet 62 are printed in Japanese, it is desirable that messages be displayed or written also in major languages other than Japanese such as Chinese, Korean, Portuguese, Spanish, and English.

Figure 12:
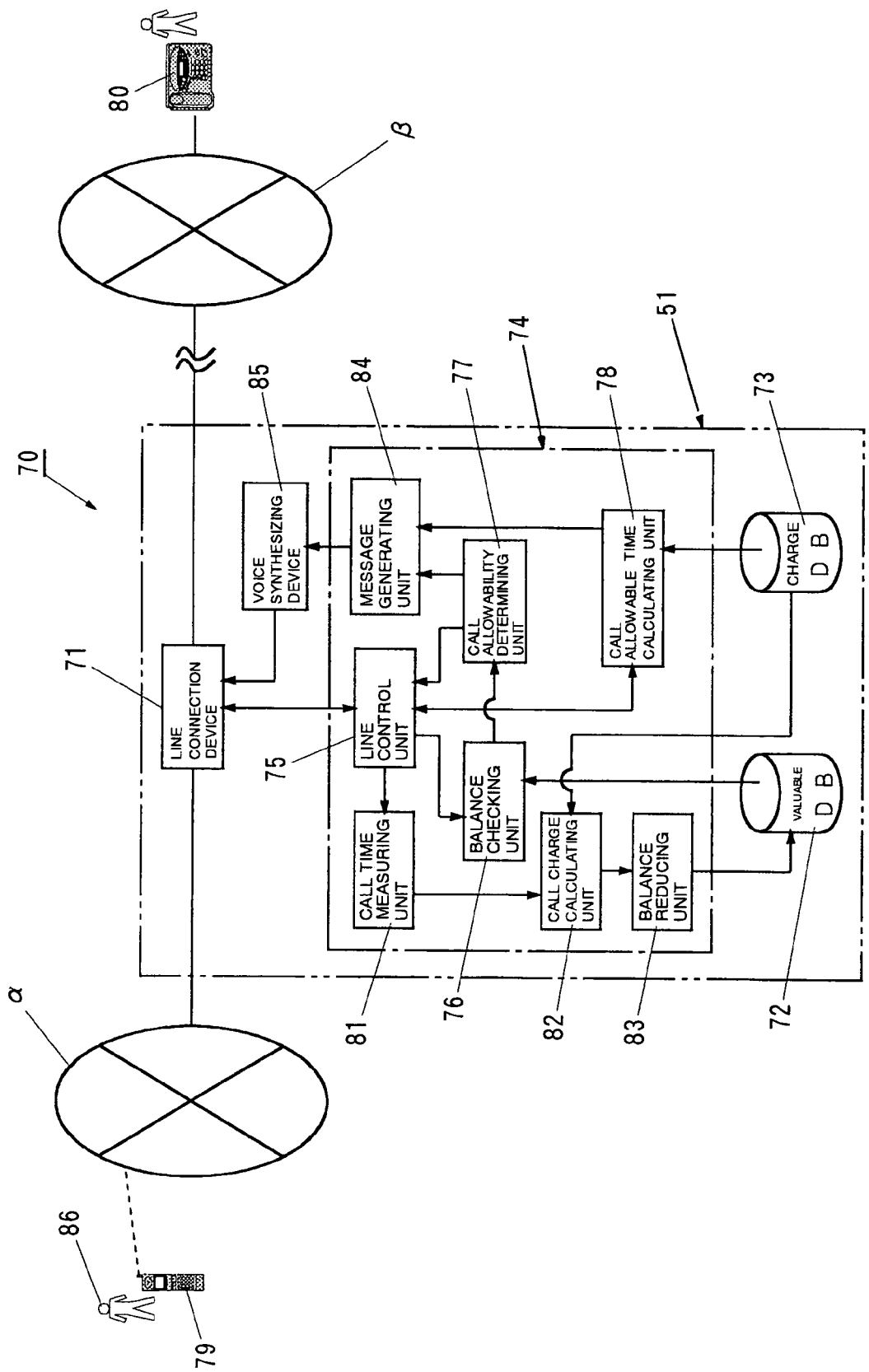
FIG. 12 is a conceptual diagram of a first call charge settlement system according to the invention.

Next, an international telephone call charge settlement system will be described with reference to FIG. 12. Although this first call charge settlement system 70 actually includes the above-described valuable cipher information issuing system 10 as a prerequisite system, only a part characteristic of call charge settlement is shown in FIG. 12.

First, an exchange 51 of company A that is an international communication company is provided with a line connection device 71 for performing line connection and disconnection, a valuable cipher information database 72 in which valuable cipher information is stored, a charge database 73 in which call charge system information of company A is stored, and a central section 74 that operates the system.

The central section 74 is the CPU (central processing unit) of a computer. Function units shown in the figure is realized by the CPU's executing dedicated application programs.

Specifically, the central section 74 is at least provided with a line control unit 75 for monitoring the line connection status and driving and controlling the line connection device 71, a balance checking unit 76 for checking a balance of valuable cipher information by searching the valuable cipher information database 72, a call allowability determining unit 77 for determining whether to allow a call based on the balance, a call allowable time calculating unit 78 for calculating a call allowable time by comparing charge data in the charge database 73 with the balance data, a call time measuring unit 81 for starting measurement of a call time at the same time as establishing a line connection between a calling-side terminal (cellular phone) 79 and a termination-side terminal 80, a call charge calculating unit 82 for calculating a call charge by applying the above call time to the charge system in the charge database 73, a balance reducing unit 83 for performing processing of reducing the balance data in the valuable cipher information database 72, and a message generating unit 84 for generating particular message signals.

A message signal generated by the message generating unit 84 is converted by a voice synthesizing device 85 into a voice, which is sent to the calling-side terminal 79 via the line connection device 71.

In this first call charge settlement system 70, the valuable cipher information database 72 corresponds to the valuable cipher information storing means 24, the charge database 73 corresponds to a charge storing means, the balance checking unit 76 corresponds to a balance checking means, the call allowability determining unit 77 corresponds to a call allowability determining means, the call allowable time calculating unit 78 corresponds to a call allowable time calculating means, the call time measuring unit 81 corresponds to a call time measuring means, the call charge calculating unit 82 corresponds to a call charge calculating means, and the balance reducing unit 83 corresponds to a balance reducing means.

The line connection device 71 and the line control unit 75 cooperate to realize a line connection means and a line disconnection means.

Figure 13:
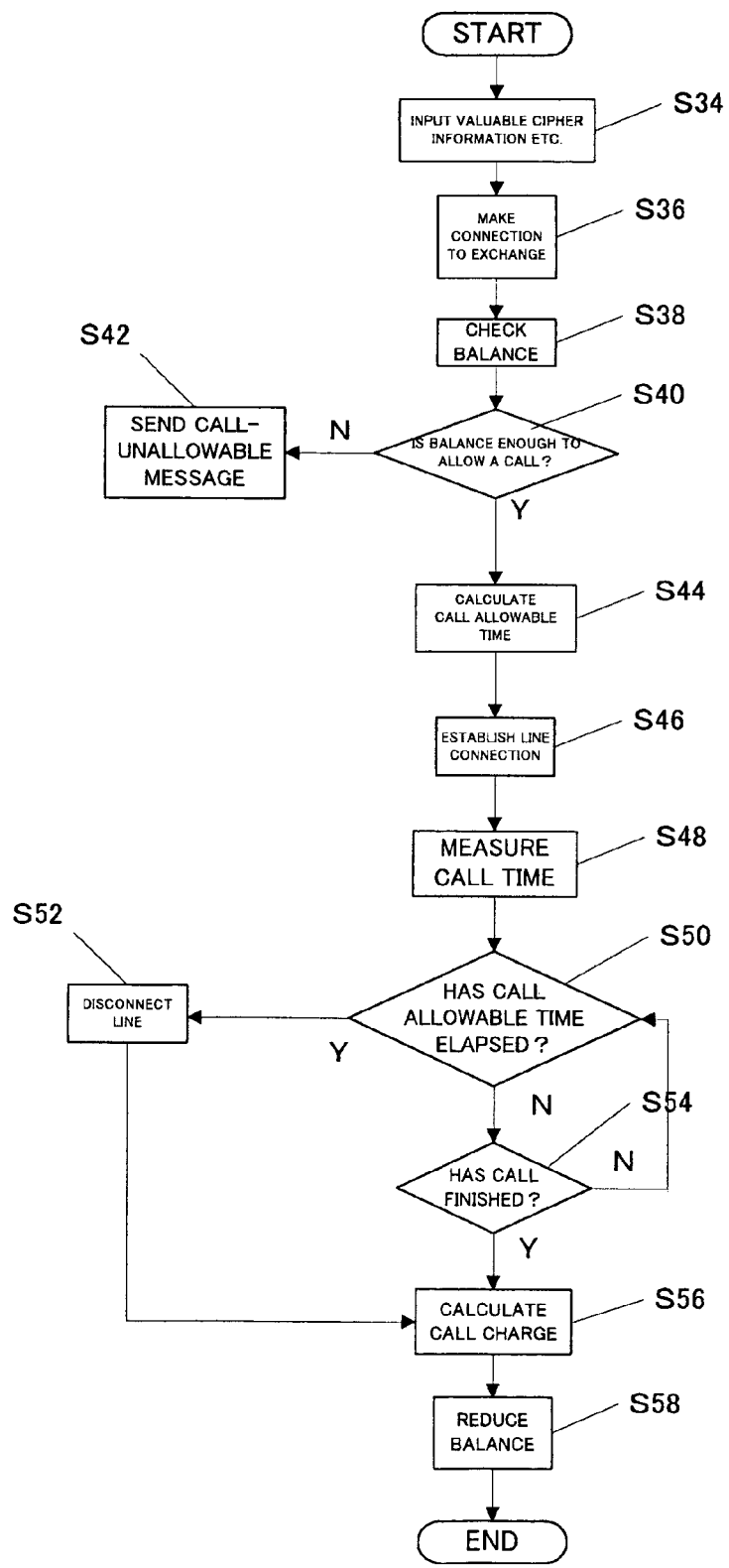
FIG. 13 is a flowchart showing a processing procedure in the above first call charge settlement system.

First, a caller 86 who has acquired an international call prepaid sheet 62 for company A in advance according to the above-described procedure inputs the valuable cipher information written on the prepaid sheet 62 and a termination-side telephone number through his own cellular phone (calling-side terminal 79) as shown in a flowchart of FIG. 13 (S34).

Since the above-mentioned valuable cipher information includes an access number of company A, a line connection is automatically made to the exchange 51 of company A via a public line network α (S36).

The balance checking unit 76 of the exchange 51 checks a balance of the amount of money that is correlated with the valuable cipher information concerned by searching the valuable cipher information database 72 using the valuable cipher information concerned as a key (S38).

The balance data thus checked is sent to the call allowability determining unit 77, which judges whether the above-mentioned balance is enough to allow a call (S40). Specifically, if the balance is smaller than a preset amount of money (e.g., ¥15), the call allowability determining unit 77 makes a judgment "a call is not allowable" and sends this judgment result to the line control unit 75 and the message generating unit 84.

The message generating unit 84 generates a message signal to the effect that "a connection cannot be established because of an insufficient balance," for example, and outputs it to the voice synthesizing device 85. Upon reception of the message signal, the voice synthesizing device 85 synthesizes a voice corresponding to it and sends the voice to the calling side via the line connection device 71 (S42). It is desirable that the system be configured in such a manner that the above-mentioned message generating unit 84 generates message signals corresponding to foreign languages such as Chinese, Korean, and English in addition to a message signal corresponding to Japanese and that the voice synthesizing device 85 converts those message signals into voices of the respective languages and sends the voices sequentially to the calling-side terminal 79.

The line control unit 75 disconnects the line for the connection to the calling-side terminal 79 at a time point when the sending of the above voice message has completed.

On the other hand, if the balance of the valuable cipher information is greater than or equal to the prescribed amount of money, the call allowability determining unit 77 makes a judgment "a call is allowable" (S40).

Then, the call allowable time calculating unit 78 applies the telephone number of the party on the other end that was input previously by the caller 86 to the charge database 73 and thereby calculates a call allowable time (S44).

Specifically, pieces of call charge unit price information of company A that are classified by the country number and the out-of-town telephone exchange number (area code) as exemplified in FIG. 14 are stored in the charge database 73.

Therefore, a call charge unit price is determined first based on the country number of the party on the other end and current date/time data and a specific call allowable time is calculated by collating the unit price with the above-mentioned balance.

For example, if the user intends to make an international call to Argentina (country number "54") on Sunday in a situation that the balance is ¥700, the call allowable time is calculated as 28 minutes.

FIG. 14 shows the example in which call charge unit prices are classified by not only the region but also the time slot of calling and the day of the week. However, it is possible to use call charge unit prices that do not depend on the day of the week and remain the same all day.

At the same time as the call allowable time is calculated in the above-described manner, the line control unit 75 drives the line connection device 71 and causes it to connect the calling-side cellular phone 79 to the termination-side communication device 80 via an international line network β (S46).

At the same time as the line connection is established between the two parties, the call time measuring unit 81 starts a call time measurement (S48).

The line control unit 75 always monitors the measurement result of the call time measuring unit 81 and judges whether the call allowable time has elapsed (S50).

If the call allowable time has elapsed, the line control unit 75 immediately outputs a control signal to the line connection device 71 to forcibly disconnect the line between the calling-side terminal 79 and the termination-side terminal 80 (S52).

The measurement result, that is, the call time, of the call time measuring unit 81 is output from the call time measuring unit 81 to the call charge calculating unit 82. The call charge calculating unit 82 calculates a call charge based on the call time according to the above-mentioned charge system stored in the charge database 73 (S56), and outputs it to the balance reducing unit 83.

The balance reducing unit 83 registers (updating), as new balance information, an amount of money obtained by subtracting the above-mentioned call charge from the balance in the valuable cipher information database 72 (S58).

If the call has finished within the call allowable time, that is, the calling-side terminal 79 and the termination-side terminal 80 have disconnected the line voluntarily, the line control unit 75 detects a disconnection signal (on-hook signal) (S54) and the call time measuring unit 81 stops the call time measurement.

The call time measured by the call time measuring unit 81 is output from the call time measuring unit 81 to the call charge calculating unit 82. The call charge calculating unit 82 calculates an actual call charge based on the call time according to the above-mentioned charge system stored in the charge database 73 (S56), and outputs it to the balance reducing unit 83.

The balance reducing unit 83 registers (updating), as new balance information, an amount of money obtained by subtracting the above-mentioned call charge from the balance in the valuable cipher information database 72 (S58).

The amount of money that was paid by the caller 86 in obtaining the international call prepaid sheet 62 has been remitted from the operator of the above-mentioned valuable cipher information issuing system 10 to the international communication company A and is allotted to the payment of the above call charge. Therefore, the international communication company A is entirely free of a risk of failure in charge collection.

Instead of disconnecting, as described above, the line abruptly at a time point when a call allowable time has elapsed (S52), the system may be configured in such a manner that the message generating unit 84 and the voice synthesizing device 85 generate an alarm such as "The call time will end in one minute." and send it to the calling-side cellular phone 79.

Figure 15:
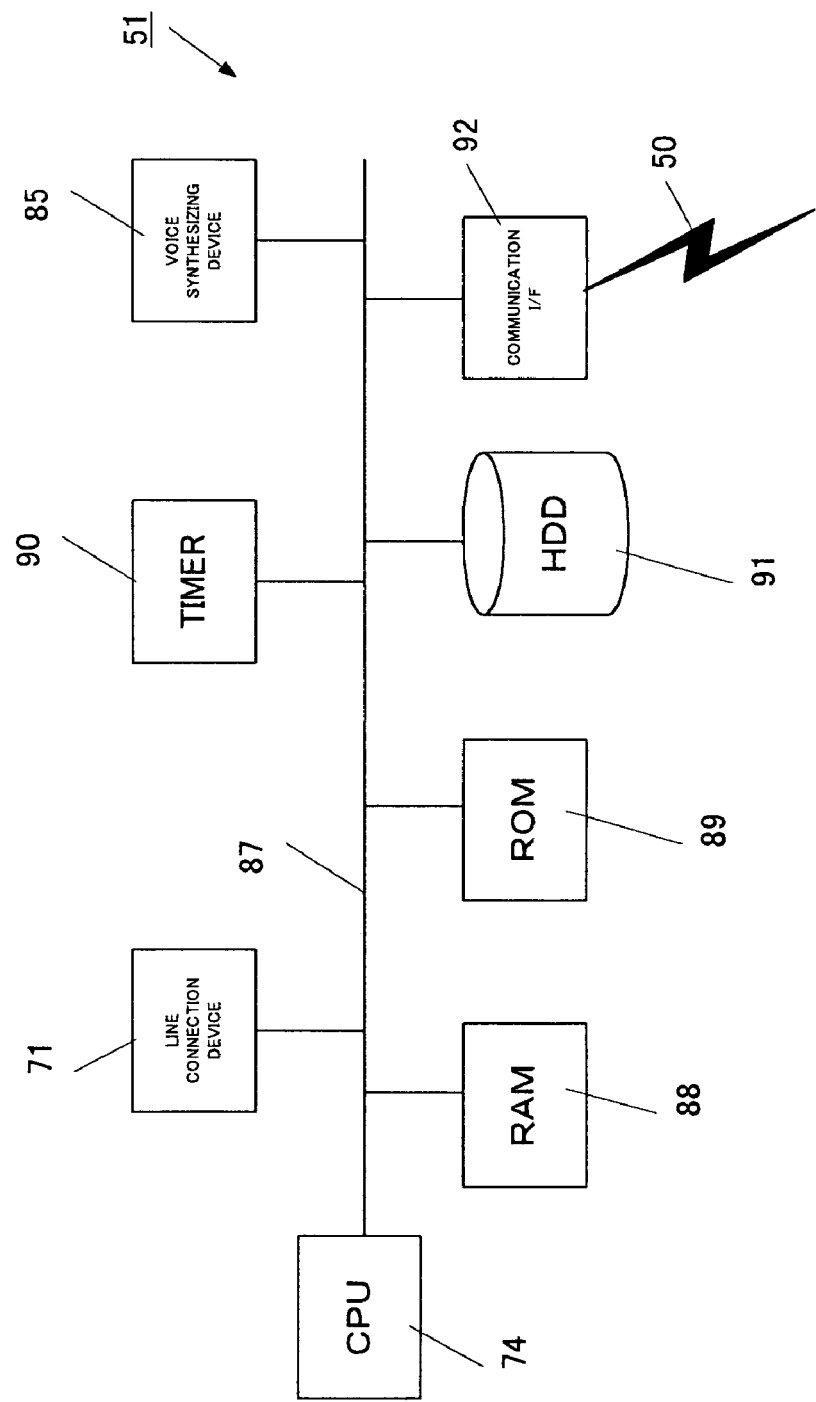
FIG. 15 shows a hardware configuration of an exchange of the international communication company.

As shown in FIG. 15, the above-described exchange 51 is at least provided with the CPU 74 as the central section and a RAM 88, a ROM 89, a timer 90, a hard disk drive 91, the line connection device 71, the voice synthesizing device 85, a communication interface 92, etc. that are connected to the above CPU 74 via a system bus 87.

Application programs and an OS (operating system) for operating the first call charge settlement system 70 are stored in the hard disk drive 91. The CPU 74 realizes the various function attaining devices and units such as the line control unit 75, the balance checking unit 76, and the call allowability determining unit 77 by executing these programs.

The above-mentioned valuable cipher information database 72 and the charge database 73 are also stored in the hard disk drive 91. The exchange 51 is connected to the above-mentioned center apparatus 30 via the above-mentioned communication interface 92 and the communication line 50, and synchronous data processing is performed aperiodically between the valuable cipher information database 72 and the valuable cipher information database that is managed by the center apparatus 30.

The calculation of a call allowable time and the measurement of a call time are realized in such a manner that a clock circuit that is incorporated in the above-mentioned timer 90 supplies date/time data to the first call charge settlement system 70.

Figure 16:
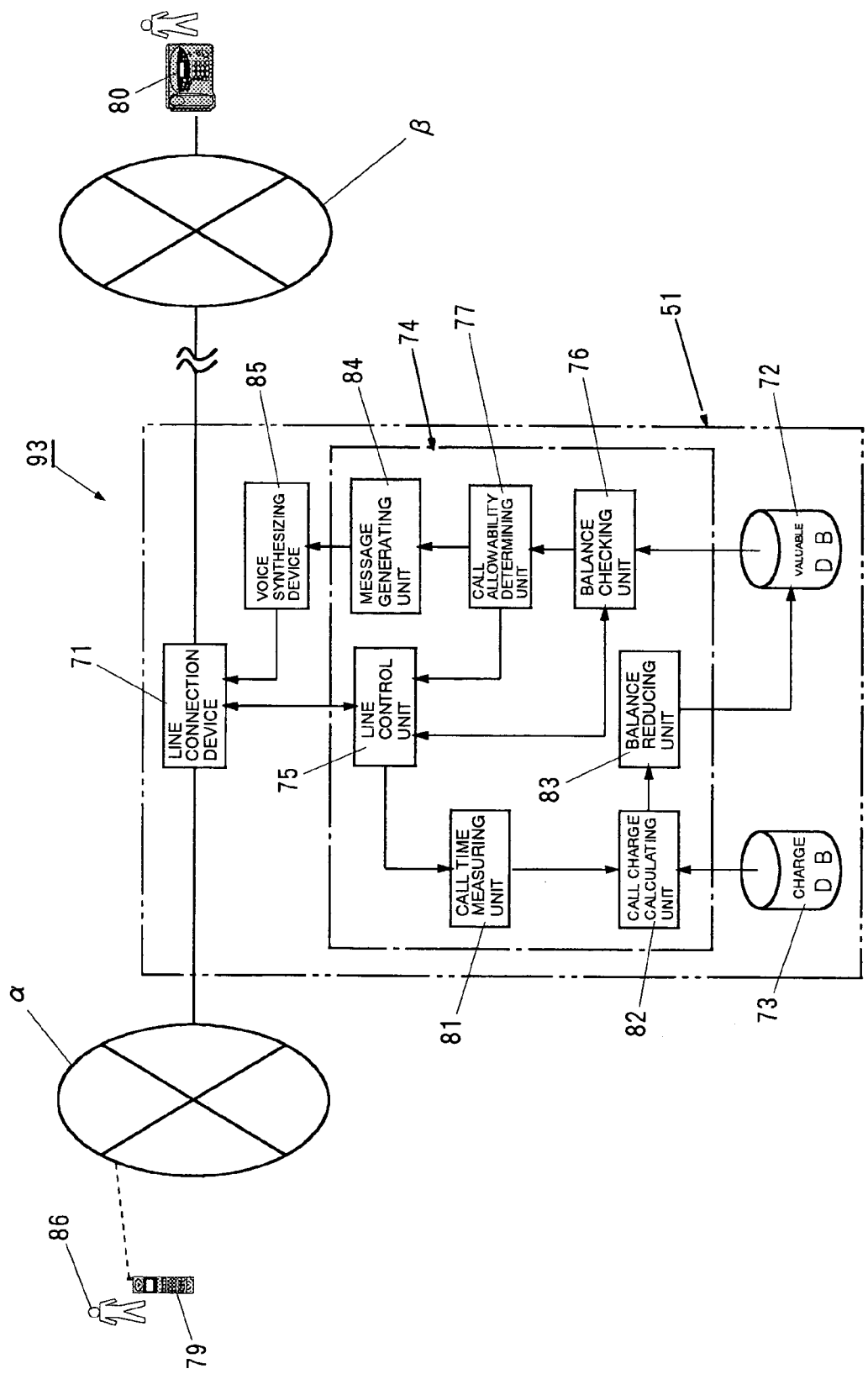
FIG. 16 is a conceptual diagram of a second call charge settlement system according to the invention.
Figure 17:
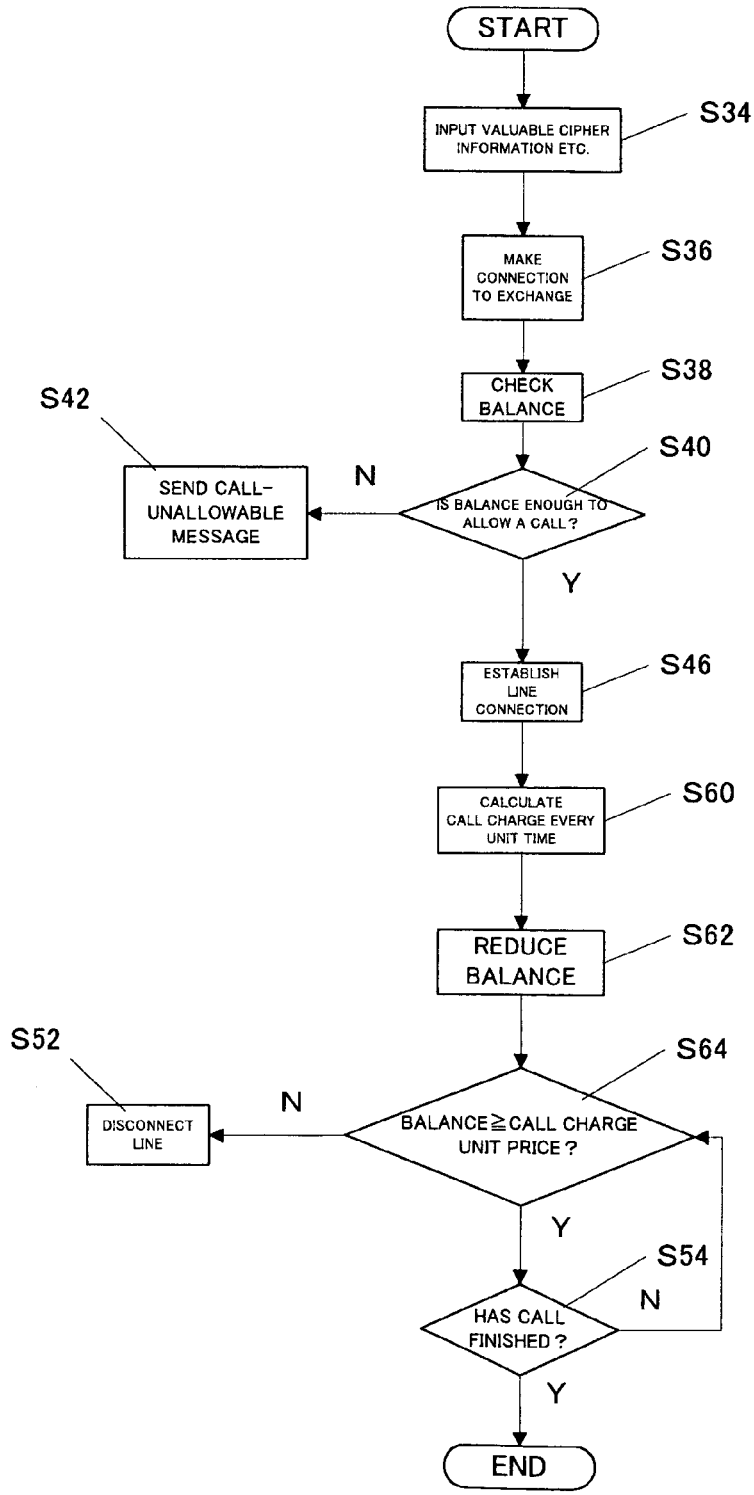
FIG. 17 is a flowchart showing a processing procedure in the above second call charge settlement system.

FIG. 16 shows the configuration of a second call charge settlement system 93, and FIG. 17 shows its processing procedure.

The second call charge settlement system 93 is characterized in the call charge calculation method and the balance reducing method and is substantially the same as the first call charge settlement system 70 in the other points. Therefore, the common items are given the same reference symbols and will not be described in detail.

The second call charge settlement system 93 is the same as the first call charge settlement system 70 in that the call time measuring unit starts measuring a call time at the same time as the call allowability determining unit 77 judges that a call is allowable and the line connection unit 71 forms a speech channel between a calling-side cellular phone 79 and a termination-side communication device 80.

However, a call allowable time is not calculated in advance. The call charge calculating unit 82 counts a call charge every prescribed unit time (e.g., 6 seconds) (S60) and the balance reducing unit 83 reduces the balance of valuable cipher information (S62) each time.

The balance checking unit 76 always monitors the balance of the valuable cipher information, and judges whether the balance is greater than or equal to a call charge unit price (S64).

When the balance has become smaller than the call charge unit price, the line control unit 75 immediately outputs a control signal to the line connection device 71 to forcibly disconnect the line between the calling-side terminal 79 and the termination-side terminal 80 (S52).

That is, whereas the first call charge settlement system 70 employs the scheme that occurrence of a call charge that exceeds a balance is prevented by calculating a call allowable time first and disconnecting the line before the actual call time exceeds the call allowable time, the second call charge settlement system 93 employs the scheme that occurrence of a call charge that exceeds a balance is prevented by subtracting a call charge from the balance every unit time and disconnecting the line before the balance becomes smaller than a call charge unit price.

Although the above descriptions are directed to the case that an international call is made from the cellular phone 79 of the caller 86, neither the first call charge settlement system 70 nor the second call charge settlement system 93 is limited to such a case.

That is, even in the case where a caller 86 causes a connection to the above-mentioned exchange 51 by inputting valuable cipher information from a stationary telephone or a public telephone, the balance of valuable cipher information can be used for settlement of a call charge in the same manner as in the case of using the cellular phone 79.

Where the communication company also handle domestic calls, the balance of valuable cipher information can be allotted to settlement of a call charge of a domestic call.

Instead of issuing different kinds of prepaid sheets 62 for individual communication companies in the valuable cipher information issuing system 10, prepaid sheets of a kind common to communication companies can be issued.

In this case, the system is configured in such a manner that an access number for a connection to the center apparatus 30 is incorporated in cipher information, whereby a connection is made to the center apparatus 30 first when a caller 86 inputs valuable cipher information from his terminal.

The center apparatus 30 selects a communication company that is most advantageous at that time in terms of the charge, and realizes a connection between the calling-side terminal and the termination-side terminal via the exchange of the selected communication company.

Naturally, the center apparatus 30 needs to be provided with the functional components such as the line connection device 71, the voice synthesizing device 85, the valuable cipher information database 72, the charge database 73, the line control unit 75, and the balance checking unit 76 that are provided in the first call charge settlement system 70 and the second call charge settlement system 93.

Figure 18:
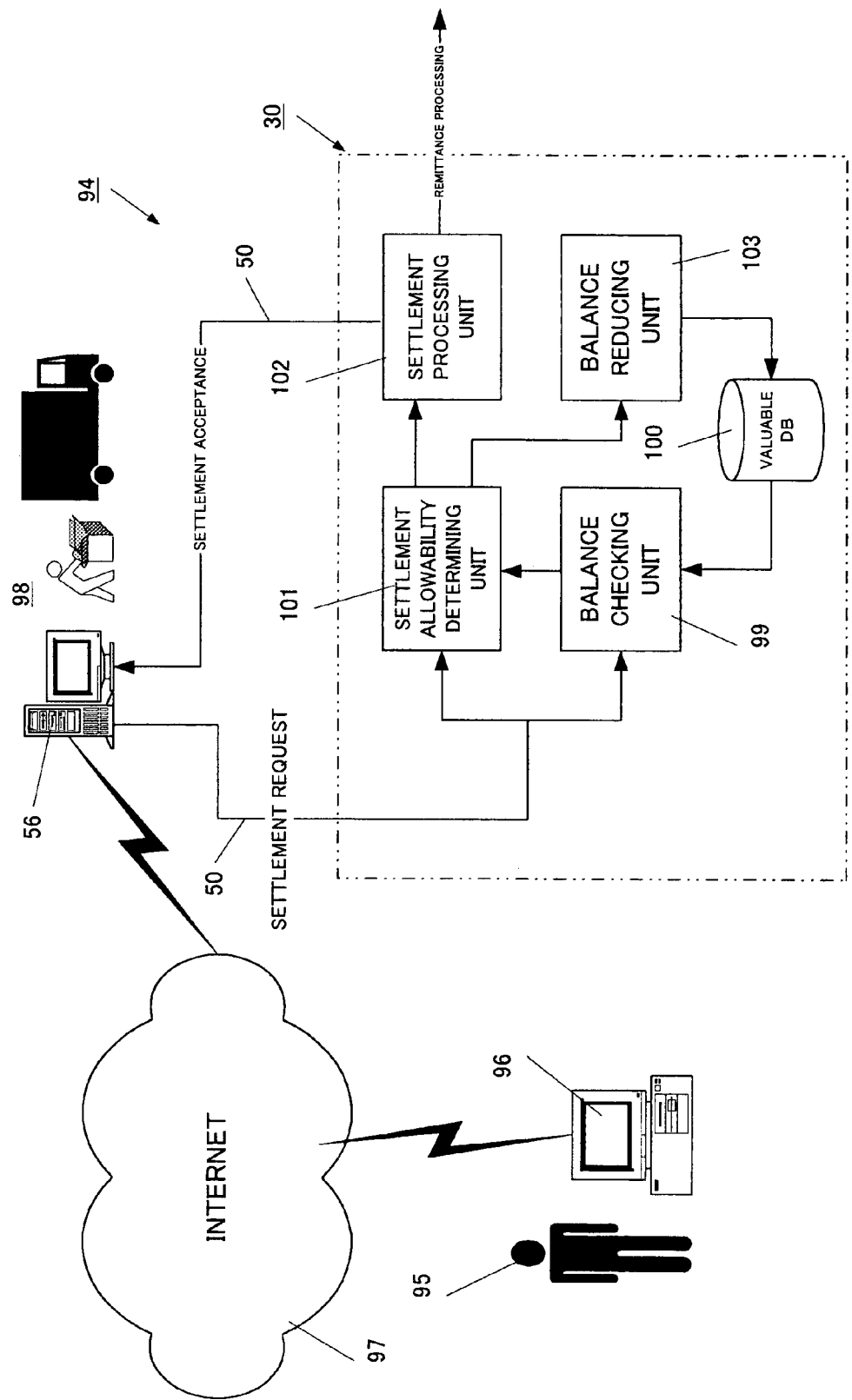
FIG. 18 is a conceptual diagram of a mail-order selling charge settlement system according to the invention.
Figure 19:
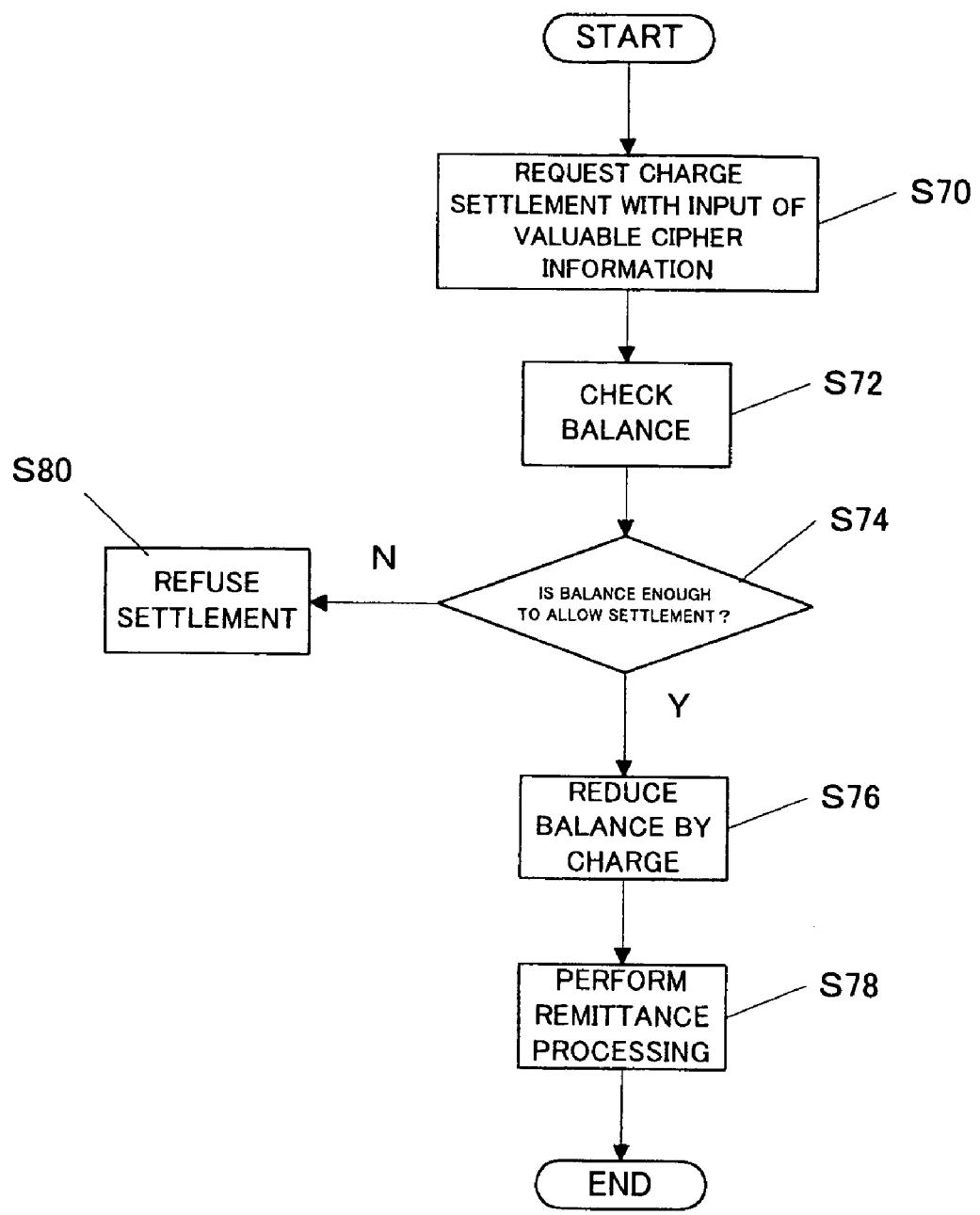
FIG. 19 is a flowchart showing a processing procedure in the above mail-order selling charge settlement system.

FIGS. 18 and 19 show an example in which valuable cipher information issued by the above-described valuable cipher information issuing system 10 is used for charge settlement of mail-order selling over the Internet.

Although this charge settlement system 94 actually includes the above-described valuable cipher information issuing system 10 as a prerequisite system, only a part characteristic of charge settlement is shown in FIG. 18.

Although not shown in the figures, when the terminal apparatus 32 that is installed in a convenience store 31 is manipulated, a process of requesting valuable cipher information dedicated to charge settlement of mail-order selling is executed. Naturally, valuable cipher information that is printed on a prepaid sheet that is output from the terminal apparatus 32 or the printer 49 does not include an access number of an international communication company.

A user 95 who has acquired valuable cipher information as mentioned above establishes a connection to the Internet 97 using his own personal computer 96 and accesses a computer system 56 (Web server) of a mail-order firm 98. After selecting a desired commodity on the home page of the mail-order firm 98, the user 95 designates a prepaid sheet (valuable cipher information) as a charge settlement method.

The mail-order firm 98 immediately accesses the center apparatus 30 that issued the valuable cipher information concerned and sends a settlement request in which a charge of the purchase (including a tax and carriage) and the valuable cipher information are specified over the communication line 50 (S70).

In the center apparatus 30 side, a balance checking unit 99 searches a valuable cipher information database 100 using, as a key, the valuable cipher information sent from the mail-order firm 98 and checks a current balance (S72).

The balance data is supplied to a settlement allowability determining unit 101, where it is compared with the above-mentioned purchase charge (S74).

If it is judged that the balance is greater than the purchase charge, a signal indicating acceptance of settlement is sent to the mail-order firm 98 via the settlement processing unit 102. Further, the amount of money corresponding to the purchase charge is subtracted from the balance via the balance reducing unit 103 (S76).

Naturally, processing of remittance to the mail-order firm 98 is performed via the settlement processing unit 102 (S78). For example, a bank remittance slip is output from a printer (not shown) that is connected to the CPU 33 of the center apparatus 30. Alternatively, processing of direct remittance to a bank account of the mail-order firm 98 may be performed via the online banking system of a bank.

It goes without saying that the settlement using the valuable cipher information concerned is refused if it is judged at step S74 that the balance is smaller than the purchase charge (S80).

Each of the balance checking unit 99, the settlement allowability determining unit 101, the settlement processing unit 102, and the balance reducing unit 103 that are provided on the above-mentioned center apparatus 30 side is realized in such a manner that the CPU 33 executes a dedicated application program.

Where the operator himself of the center apparatus 30 does a mail-order selling business, naturally the balance of valuable cipher information can be used for settlement of a charge occurring in the business. Further, it is advantageous that the steps relating to remittance processing can be skipped.

Valuable cipher information issued by the above-described valuable cipher information issuing system 10 can also be used for purposes other than charge settlement of mail-order selling such as settlement of an entrance fee of a baseball stadium or a movie theater.

In this case, on the surface of the prepaid sheets 62, quick input processing is enabled by printing a bar code of valuable cipher information as well as writing it in the form of numbers and reading the valuable cipher information with a bar code scanner at the time of entrance.

INDUSTRIAL APPLICABILITY

In the valuable cipher issuing system and issuing method according to the invention, valuable cipher information is generated by pairing cipher information with amount-of-money information and is output to a user at a time point when cash payment or completion of settlement using a credit card has been confirmed. This is in contrast to the case of conventional international call prepaid cards that are distributed in a state that cipher information that is correlated with an amount-of-money information in advance is shown on each card. Therefore, the valuable cipher issuing system and issuing method according to the invention is entirely free of a risk of theft or the like during the course of distribution.

Since valuable cipher information is directly issued to a person who wants to use it, it is not necessary to output it to a rigid card or to perform processing for hiding a number. Therefore, valuable cipher information can be issued very easily at a low cost.

Where a valuable cipher of the above kind is used for call charge settlement of an international call or the like, there is no risk of failure in charge collection and hence it is not necessary to perform a cumbersome advance examination or to oblige a user to pay deposit. The user can make a call from his own cellular phone or the like once he has valuable cipher information issued by simple manipulations.

Further, where a valuable cipher of the above kind is used for charge settlement of mail-order selling, the mail-order firm side has an advantage that safe transactions can be performed with no risk of failure in charge collection. The consumer side has an advantage that a remittance charge and a COD charge (additive charges) can be saved.

Should valuable cipher information leak to a third party, resulting damage would be within a balance. There is no risk of an unexpectedly large amount of damage as would be caused by theft of a credit card or a cash card. Therefore, the means according to the invention is particularly effective as a charge settlement means for online shopping over the Internet.

What is claimed is:

1. A telephone call charge settlement system having a center apparatus, a terminal apparatus that is network-connected to the center apparatus via a communication line, and computer systems that are network-connected to the center apparatus via communication lines and managed by a plurality of communication companies, characterized in:
   that the terminal apparatus comprises:
   a display for displaying a picture for selection of a prepaid sheet relating to each communication company;
   input means for selection of a particular communication company and a necessary amount of money; and
   means for sending the center apparatus a communication company and a necessary amount of money that have been selected by a user;
   that the center apparatus comprises:
   cipher information storing means for accumulating pieces of cipher information each being a string of a prescribed number of characters including at least an access number to be used for making a connection to the computer system of each communication company;
   means for generating, when paid amount of money information indicating an amount of money paid by the user is sent from the terminal apparatus or another terminal apparatus, valuable cipher information in which the amount of money is correlated with cipher information of the communication company selected by the user on condition that the necessary amount of money coincides with the paid amount of money; and
   means for sending the valuable cipher information to the terminal apparatus and the computer system of the communication company selected by the user; and
   that the computer system of the communication company comprises:
   valuable cipher information storing means for storing valuable cipher information that is sent from the center apparatus;
   charge storing means for accumulating a charge system of the communication company itself;
   balance checking means for checking, when valuable cipher information and a termination-side telephone number are input from a calling-side terminal and a line connection to the calling-side terminal is established via a public line network, a balance of an amount of money that is correlated with the valuable cipher information by searching the valuable cipher information storing means using the valuable cipher information as a key;
   line connection means for establishing a connection between the calling-side terminal and the termination-side terminal if the balance is greater than or equal to a prescribed amount;
   call allowable time calculating means for calculating a call allowable time by applying the balance to the charge system;
   call time measuring means for measuring a time of a call between the calling-side terminal and the termination-side terminal;
   line disconnection means for disconnecting a speech channel between the calling-side terminal and the termination-side terminal at a time point when the call allowable time has elapsed;
   call charge calculating means for calculating a call charge by applying the call time to the charge system; and
   balance reducing means for subtracting the call charge from the balance.

2. A telephone call charge settlement system having a center apparatus, a terminal apparatus that is network-connected to the center apparatus via a communication line, and computer systems that are network-connected to the center apparatus via communication lines and managed by a plurality of communication companies, characterized in:
   that the terminal apparatus comprises:
   a display for displaying a picture for selection of a prepaid sheet relating to each communication company;
   input means for selection of a particular communication company and a necessary amount of money; and
   means for sending the center apparatus a communication company and a necessary amount of money that have been selected by a user;
   that the center apparatus comprises:
   cipher information storing means for accumulating pieces of cipher information each being a string of a prescribed number of characters including at least an access number to be used for making a connection to the computer system of each communication company;
   means for generating, when paid amount of money information indicating an amount of money paid by the user is sent from the terminal apparatus or another terminal apparatus, valuable cipher information in which the amount of money is correlated with cipher information of the communication company selected by the user on condition that the necessary amount of money coincides with the paid amount of money; and means for sending the valuable cipher information to the terminal apparatus and the computer system of the communication company selected by the user; and that the computer system of the communication company comprises:

valuable cipher information storing means for storing valuable cipher information that is sent from the center apparatus;

charge storing means for accumulating a charge system of the communication company itself;

balance checking means for checking, when valuable cipher information and a termination-side telephone number are input from a calling-side terminal and a line connection to the calling-side terminal is established via a public line network, a balance of an amount of money that is correlated with the valuable cipher information by searching the valuable cipher information storing means using the valuable cipher information as a key;

line connection means for establishing a connection between the calling-side terminal and the termination-side terminal if the balance is greater than or equal to a prescribed amount;

call time measuring means for measuring a time of a call between the calling-side terminal and the termination-side terminal;

balance reducing means for calculating a call charge every prescribed unit time by referring to the charge system and reducing the balance each time; and line disconnection means for disconnecting a speech channel between the calling-side terminal and the termination-side terminal at a time point when the balance has become smaller than or equal to a prescribed amount.

3. A telephone call charge settlement system having a center apparatus, a terminal apparatus that is network-connected to the center apparatus via a communication line, computer systems that are network-connected to the center apparatus via communication lines and managed by a plurality of communication companies, and a computer system that is network-connected to the center apparatus via a communication line and managed by a credit card company, characterized in:

that the terminal apparatus comprises:

a display for displaying a picture for selection of a prepaid sheet relating to each communication company;

input means for selection of a particular communication company and a necessary amount of money; and means for sending the center apparatus a communication company and a necessary amount of money that have been selected by a user;

that the center apparatus comprises:

cipher information storing means for accumulating pieces of cipher information each being a string of a prescribed number of characters including at least an access number to be used for making a connection to the computer system of each communication company;

card settlement processing means for sending, when information relating to a credit card of the user is sent from the terminal apparatus or another terminal apparatus, the credit card information and the necessary amount of money to the computer system of the credit card company to request credit card settlement, and for checking whether the credit card settlement has completed;

means for generating valuable cipher information in which the amount of money is correlated with cipher information of the communication company selected by the user when the credit card settlement has completed; and means for sending the valuable cipher information to the terminal apparatus and the computer system of the communication company selected by the user; and that the computer system of the communication company comprises:

valuable cipher information storing means for storing valuable cipher information that is sent from the center apparatus;

charge storing means for accumulating a charge system of the communication company itself;

balance checking means for checking, when valuable cipher information and a termination-side telephone number are input from a calling-side terminal and a line connection to the calling-side terminal is established via a public line network, a balance of an amount of money that is correlated with the valuable cipher information by searching the valuable cipher information storing means using the valuable cipher information as a key;

line connection means for establishing a connection between the calling-side terminal and the termination-side terminal if the balance is greater than or equal to a prescribed amount;

call allowable time calculating means for calculating a call allowable time by applying the balance to the charge system;

call time measuring means for measuring a time of a call between the calling-side terminal and the termination-side terminal;

line disconnection means for disconnecting a speech channel between the calling-side terminal and the termination-side terminal at a time point when the call allowable time has elapsed;

call charge calculating means for calculating a call charge by applying the call time to the charge system; and balance reducing means for subtracting the call charge from the balance.

4. A telephone call charge settlement system having a center apparatus, a terminal apparatus that is network-connected to the center apparatus via a communication line, computer systems that are network-connected to the center apparatus via communication lines and managed by a plurality of communication companies, and a computer system that is network-connected to the center apparatus via a communication line and managed by a credit card company, characterized in:

that the terminal apparatus comprises:

a display for displaying a picture for selection of a prepaid sheet relating to each communication company;

input means for selection of a particular communication company and a necessary amount of money; and means for sending the center apparatus a communication company and a necessary amount of money that have been selected by a user;

that the center apparatus comprises:

cipher information storing means for accumulating pieces of cipher information each being a string of a prescribed number of characters including at least an access number to be used for making a connection to an exchange of each communication company;

card settlement processing means for sending, when information relating to a credit card of the user is sent from the terminal apparatus or another terminal apparatus, the credit card information and the necessary amount of money to the computer system of the credit card company to request credit card settlement, and for checking whether the credit card settlement has completed;

means for generating valuable cipher information in which the amount of money is correlated with cipher information of the communication company selected by the user when the credit card settlement has completed; and means for sending the valuable cipher information to the terminal apparatus and the computer system of the communication company selected by the user; and that the computer system of the communication company comprises:

valuable cipher information storing means for storing valuable cipher information that is sent from the center apparatus;

charge storing means for accumulating a charge system of the communication company itself;

balance checking means for checking, when valuable cipher information and a termination-side telephone number are input from a calling-side terminal and a line connection to the calling-side terminal is established via a public line network, a balance of an amount of money that is correlated with the valuable cipher information by searching the valuable cipher information storing means using the valuable cipher information as a key;

line connection means for establishing a connection between the calling-side terminal and the termination-side terminal if the balance is greater than or equal to a prescribed amount;

call time measuring means for measuring a time of a call between the calling-side terminal and the termination-side terminal;

balance reducing means for calculating a call charge every prescribed unit time by referring to the charge system and reducing the balance each time; and line disconnection means for disconnecting a speech channel between the calling-side terminal and the termination-side terminal at a time point when the balance has become smaller than or equal to a prescribed amount.

* * * * *